United States Patent [19]

Salas et al.

[11] Patent Number: 4,545,010
[45] Date of Patent: Oct. 1, 1985

[54] MEMORY IDENTIFICATION APPARATUS AND METHOD

[75] Inventors: Edward R. Salas, Billerica; Edwin P. Fisher, N. Abington; Robert B. Johnson, Billerica; Chester M. Nibby, Jr., Peabody; Daniel A. Boudreau, Billerica, all of Mass.

[73] Assignee: Honeywell Information Systems Inc., Waltham, Mass.

[21] Appl. No.: 480,964

[22] Filed: Mar. 31, 1983

[51] Int. Cl.[4] .............................................. G06F 13/00
[52] U.S. Cl. .................................................... 364/200
[58] Field of Search ... 364/200 MS File, 900 MS File

[56] References Cited

U.S. PATENT DOCUMENTS 4,001,790  1/1977  Barlow ................................. 364/200
4,323,965  4/1982  Johnson et al. ...................... 364/200

Primary Examiner—Raulfe B. Zache
Attorney, Agent, or Firm—Faith F. Driscoll; Nicholas Prasinos

[57] ABSTRACT

A memory system includes at least one or more memory module boards identical in construction and a single computer board containing the control circuits for controlling memory operations. Each board plugs into the main board and includes a memory section having a number of rows of memory chips and an identification section containing circuits for generating signals indicating the board density and the type of memory parts used in constructing the board's memory section. The main board control circuits include a number of decoder circuits which couple to the identification and to the memory section of each memory module board. The decoder circuits receive different address bit combinations of a predetermined multibit address portion of each memory request address. In response to signals generated by the identification sections of the installed memory boards, the decoder circuits are selectively enabled to decode those bit combinations of the address portion specified by the sections for enabling successive addressing of all of the blocks of location within the system.

49 Claims, 13 Drawing Figures

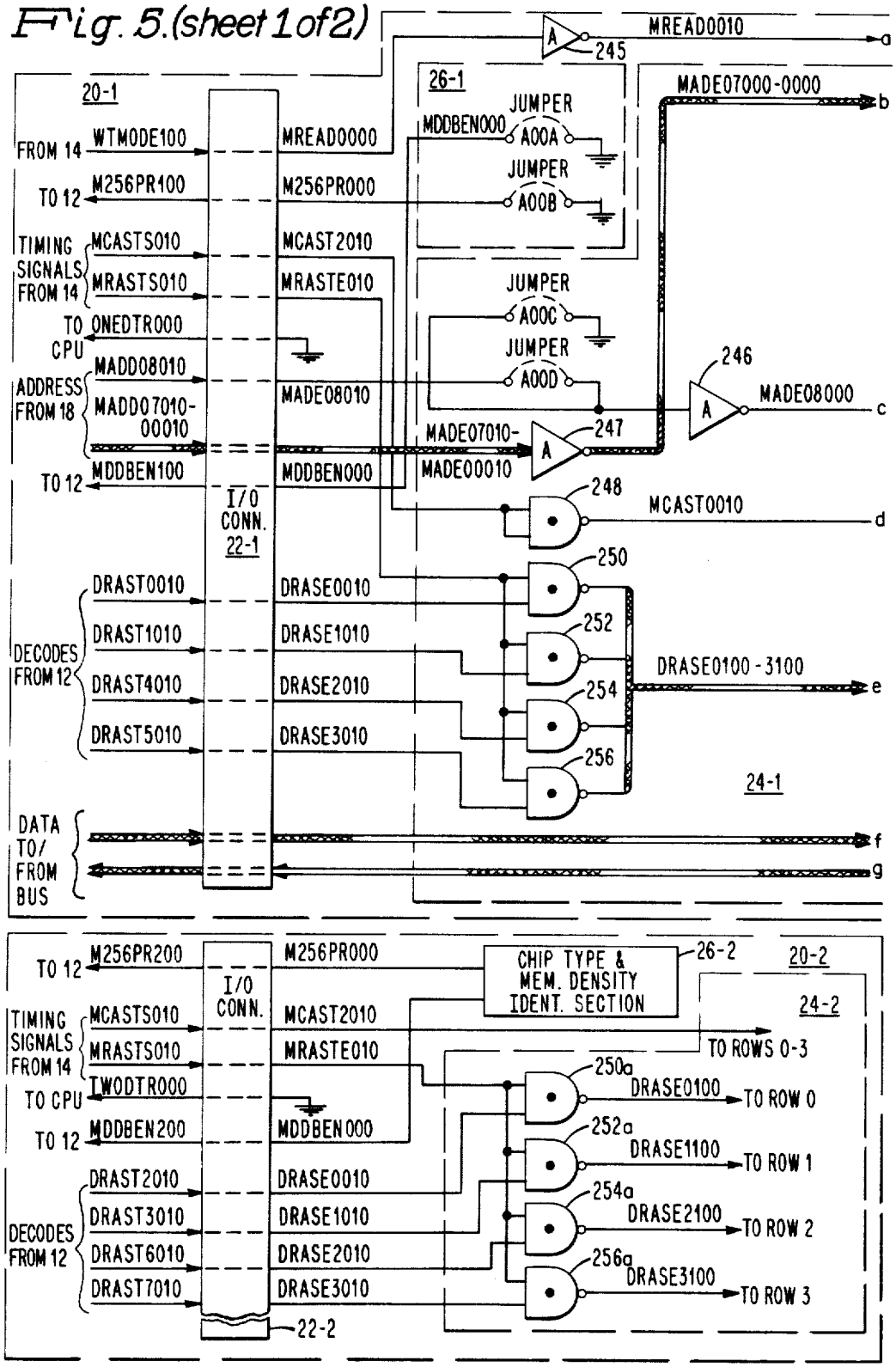
Fig. 5.(sheet 1 of 2)

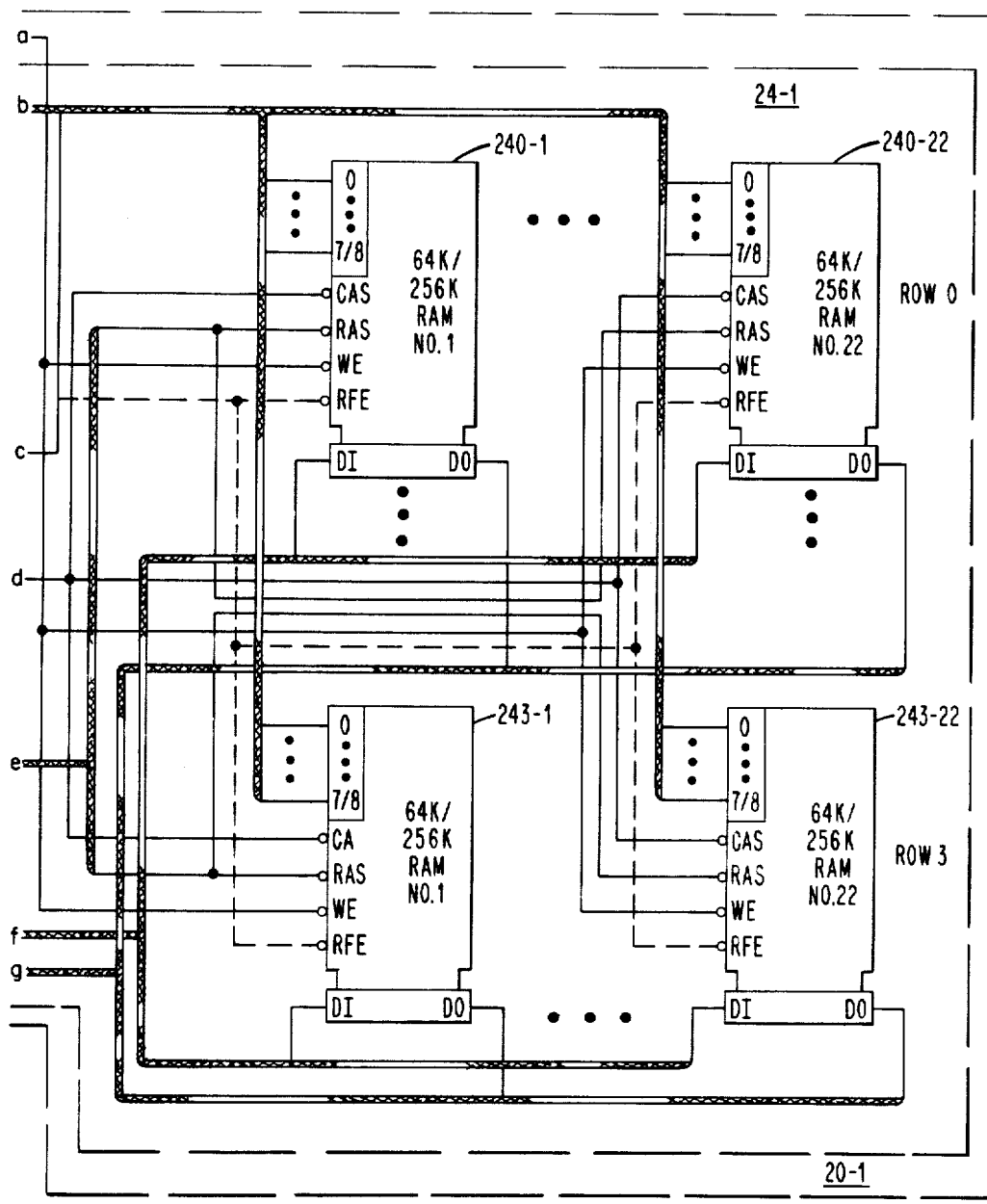
Fig. 5. (sheet 2 of 2)

| JUMPER | IN | OUT | DAUGHTER BOARD CONFIGURATION |
|---|---|---|---|
| A00A | * |   | DOUBLE DENSITY |
| A00A |   | * | NORMAL DENSITY |
| A00B | * |   | 256K RAM CHIPS USED |
| A00B |   | * | 64K RAM CHIPS USED |
| A00C | * |   | 64K RAM CHIPS USED |
| A00C |   | * | 256K RAM CHIPS USED |
| A00D | * |   | 256K RAM CHIPS USED |
| A00D |   | * | 64K RAM CHIPS USED |

MEMORY IDENTIFICATION APPARATUS AND METHOD

RELATED APPLICATION

1. "Technique for Determining Maximum Physical Memory Present in a System and for Detecting Attempts to Access Nonexistent Memory", invented by Daniel A. Boudreau and Edward R. Salas, Ser. No. 06/481,107 filed on Mar. 31, 1983, and assigned to the same assignee as named herein.

BACKGROUND OF THE INVENTION

1. Field of Use

The present invention relates to memory systems and more particularly to an apparatus for simplifying the construction and expansion of such systems.

2. Prior Art

It is well known that modular memory systems permit ready expansion of user memory system or memory space. In order to accommodate such expansion, memory system manufacturers have been required to construct a number of different memory systems having different memory capacities or different size increments of memory. This, in turn, has necessitated the construction of a number of different types of memory units.

One prior art system disclosed in U.S. Pat. No. 4,001,790 assigned as named herein employs an arrangement which can utilize the same memory board construction for any one of a number of memory modules which connected, to a memory controller. In the arrangement, one type of memory board (mother board) includes the control logic circuits and another type of memory board (daughter board) contains the memory module. It is required that the memory module be capable of being plugged into any one of a number of different positions.

In this type of arrangement, it is possible to upgrade and expand the capacity of memory system utilizing the two types of memory boards mentioned above. The memory increment or memory size in this case corresponds to the capacity of the daughter board.

To reduce the number of different types of memory boards, the prior art system disclosed in U.S. Pat. No. 4,296,467 employs a number of memory modules identical in layout and construction. Each board includes rotating chip selection circuits which include a set of switches and an arithmetic unit. By altering the set of switches, the arithmetic unit is conditioned to generate a desired logical row address for enabling chips physically positioned at an initial row location in response to different address values.

While the arrangement reduces the number of different types of memory boards to a minimum, the system is required to include address configuration circuits. Such circuits normally contain a further set of switches and comparison logic circuits for generating signals representative of the addressable memory space or memory increment being provided by a particular board. Also, expansion beyond the maximum capacity of the board still requires utilization of different board types.

U.S. Pat. No. 4,303,993, assigned to the same assignee as named herein, discloses a memory subsystem which utilizes memory module boards of identical construction. Each board includes a set of switches which couple to the memory present circuits. By altering the set of switches, the memory present circuits can be conditioned to generate an output signal indicating the same increment of memory or memory module board is present when a different memory segment is being addressed.

Arrangements of the type described above require field or installation personnel to set up the set of switches on each memory board to define the size, segment or memory space which is being added or installed in the system. This tends to complicate the assembly or maintenance procedures, particularly when the memory system can be configured to provide a variety of different addressing ranges. The problem is further complicated where memory boards can be constructed from a variety of different types of memory parts and with different densities of memory chips.

Accordingly, it is a primary object of the present invention, to provide a technique and apparatus for constructing a low cost modular memory system.

It is a further object of the present invention to provide a low cost memory system which can be constructed from a variety of different types of memory parts and which provides a variety of different memory densities.

SUMMARY OF THE INVENTION

The above objects of the present invention are achieved in a preferred embodiment of a memory system constructed by employing the technique and apparatus of the present invention. The memory system includes one or more memory module boards identical in construction and a single computer main (mother) board containing the control circuits for controlling memory operations. Each board plugs into the mother board and includes a memory section having a number of rows of memory chips and an identification section containing circuits for generating signals indicating characteristics of the board such as density and the type of memory parts used in constructing the board's memory section. The identification sections of each board connect in common.

The main board control circuits include a number of decoder circuits which couple to the identification section and to the memory section of each memory module board. The decoder circuits are connected to receive different combinations of address bits of a predetermined multibit address portion of each memory request address used to access the contents of a memory location. In response to signals generated by the identification sections of the installed memory boards, the decoder circuits are selectively enabled to decode those bit combinations of the address portion identified by the sections. This in turn produces the desired sequence of row address select signals which are selectively applied to the memory boards installed in the system for enabling the successive addressing of all of the blocks of locations within the rows of memory chips contained in the boards' memory sections.

In the preferred embodiment, the memory module boards can be constructed from either of two types of memory chips and have either of two densities. When the memory section is completely populated, the memory module board has a high density of chips termed "double density". When the memory section is half populated, the memory module board has a lower density termed "normal density". Through the inclusion of an identification section within each module board, the system of the present invention is able to generate automatically the desired sequence of row address select signals for addressing any location within the memory system. This obviates the need to employ additional set up steps in assembling or replacing memory module boards within the system. It also improves system reliability.

Moreover, the blocks or rows of addresses provided by the memory module boards installed in the system are established automatically and without requiring additional switches or logic circuits. Also, normal density memory module boards can be replaced with double density memory module boards and memory module boards constructed with one type of memory part (e.g. 64K RAM chips) can be replaced with memory module boards constructed with another type of memory part (e.g. 256K RAM chip) without requiring changes to the system.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 3 through 5 show in greater detail different ones of the blocks of FIG. 1.

DESCRIPTION OF THE PREFERRED EMBODIMENT

Figure 1:
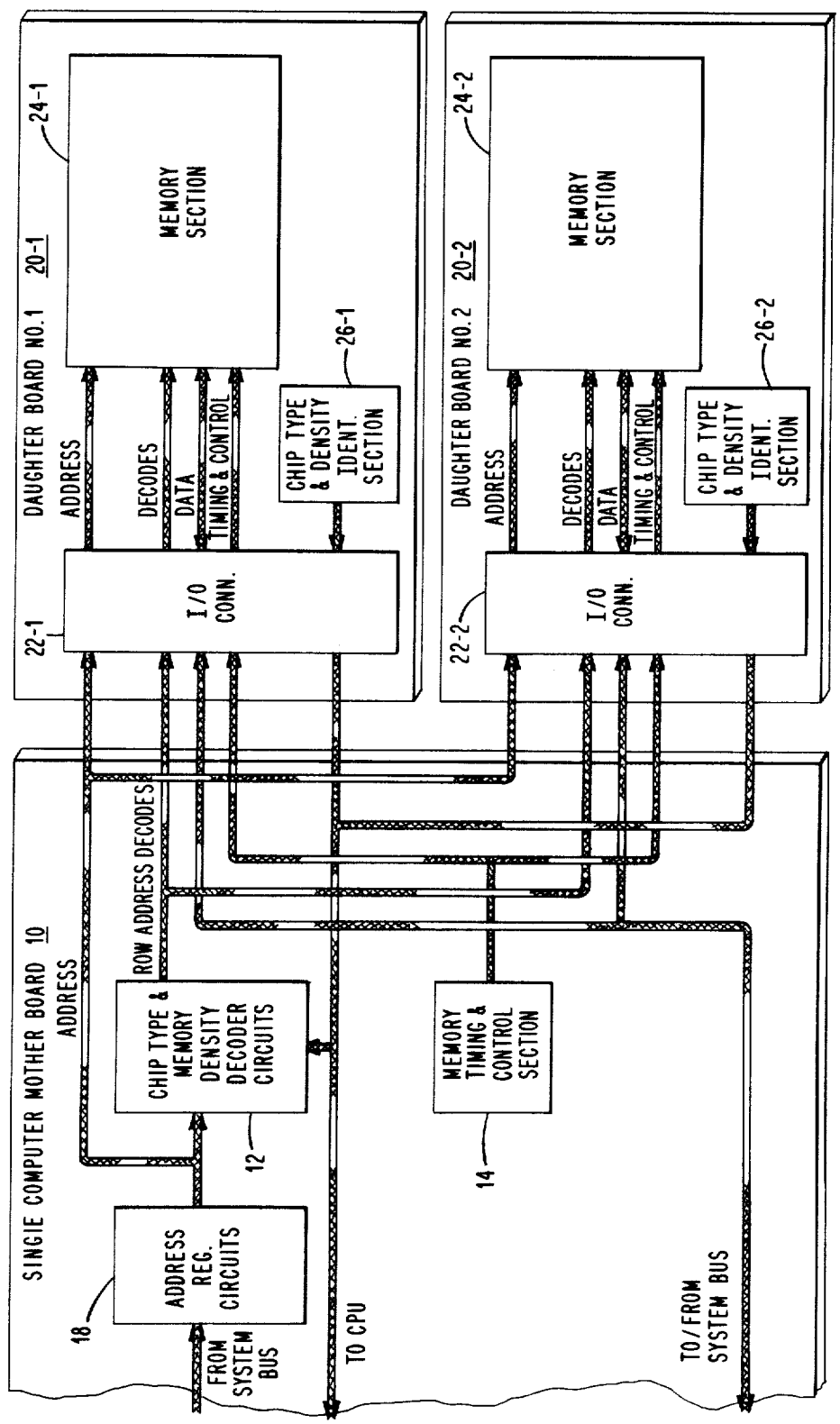
FIG. 1 is a block diagram of a memory system which incorporates the method and apparatus of the present invention.

FIG. 1 shows in block diagram form a preferred embodiment of the memory system of the present invention. As shown, the memory system includes a single computer main/mother board 10 and a pair of pluggable memory module daughter boards 20-1 and 20-2. The daughter boards 20-1 and 20-2 connect to board 10 via 80 pin I/O connectors 22-1 and 22-2.

The board 10 includes all of the memory control logic circuits of the system. These circuits include the address register circuits of block 18, the memory timing and control circuits of block 14, and the chip type and memory density circuits of block 12. The address register circuits of block 18, shown in greater detail in FIG. 4, receive for storage the address portion of each memory request or command applied via a system bus. The register circuits apply different ones of these address signals to daughter boards 20-1 and 20-2 and to the circuits of block 12.

Figure 3:
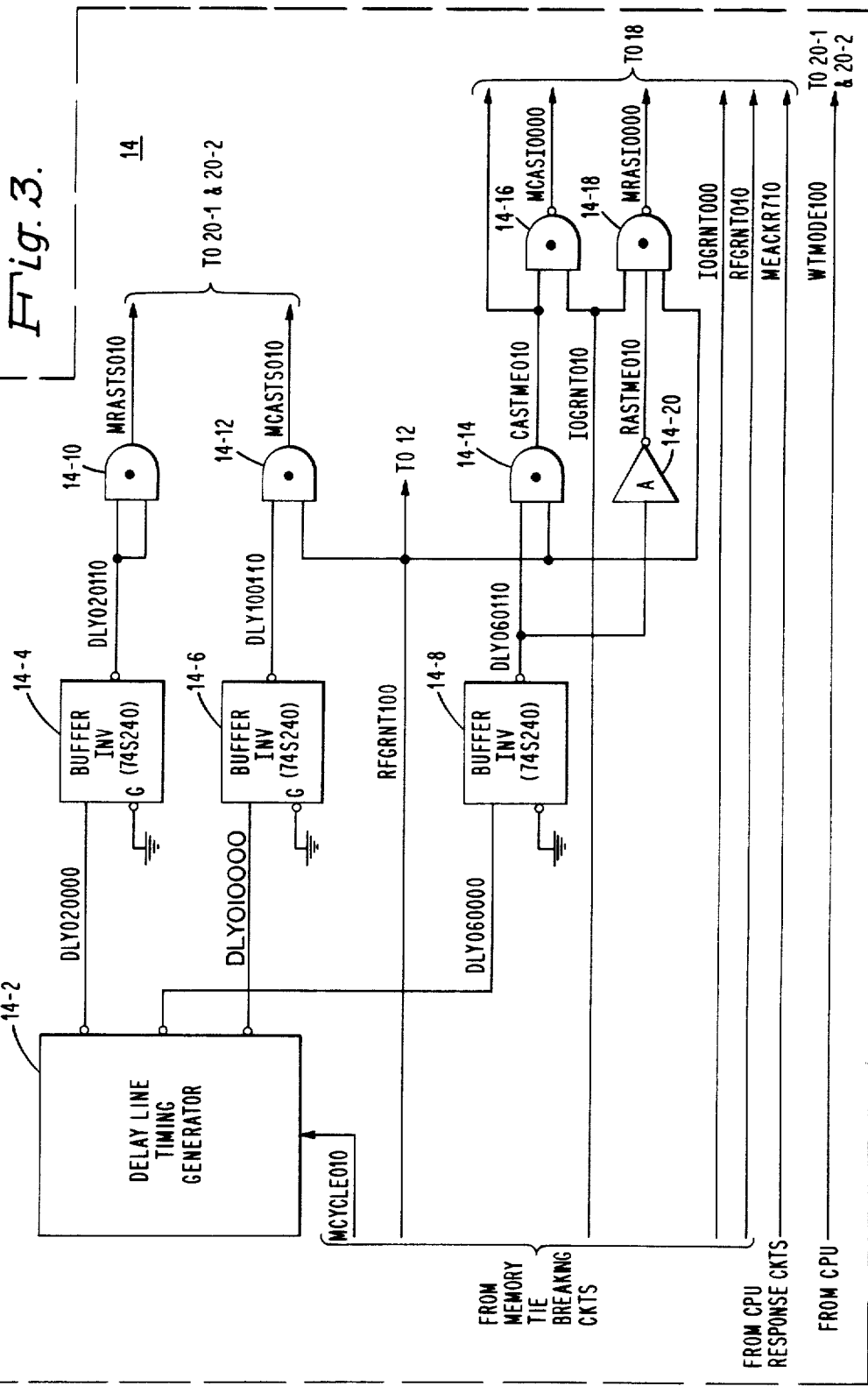

The circuits of block 14, shown in greater detail in FIG. 3, generate the required sequence of timing strobe signals for performing a memory read or write cycle of operation. As shown, these circuits apply timing signals to the daughter boards 20-1 and 20-2.

Figure 2A:
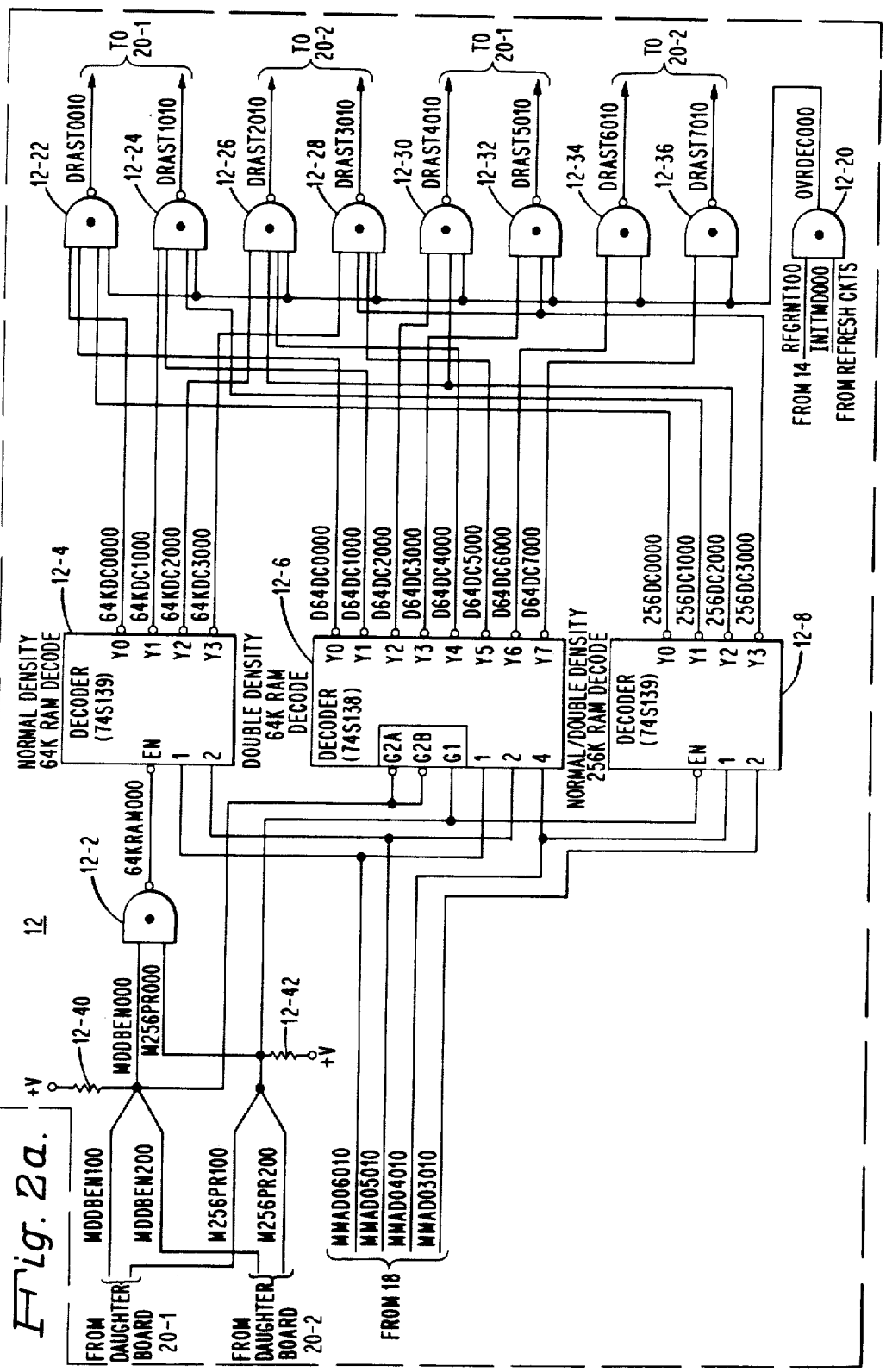
FIGS. 2a through 2c show different embodiments of the decoding apparatus of FIG. 1 constructed according to the teachings of the present invention.
Figure 2B:
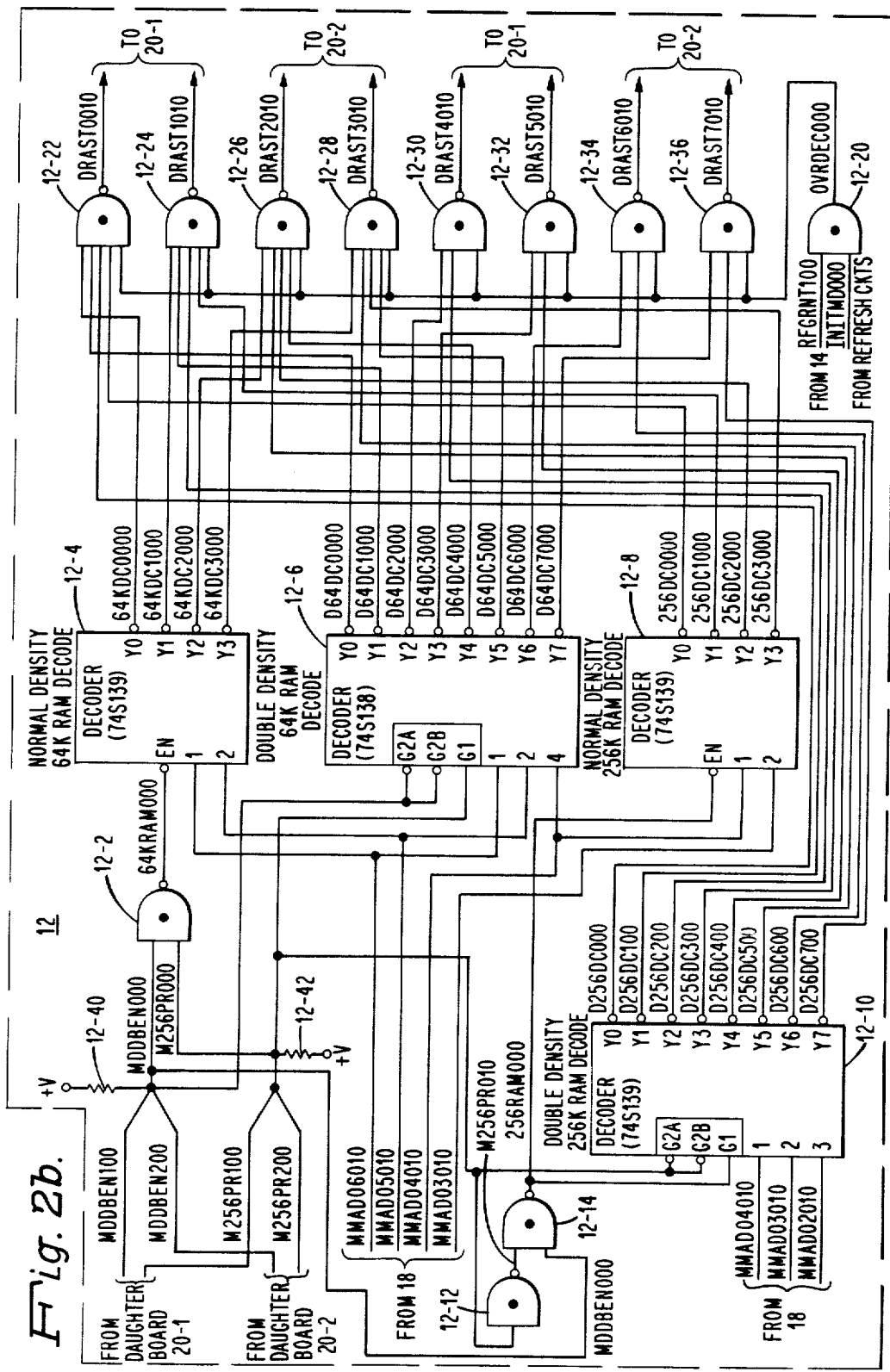
Figure 2C:
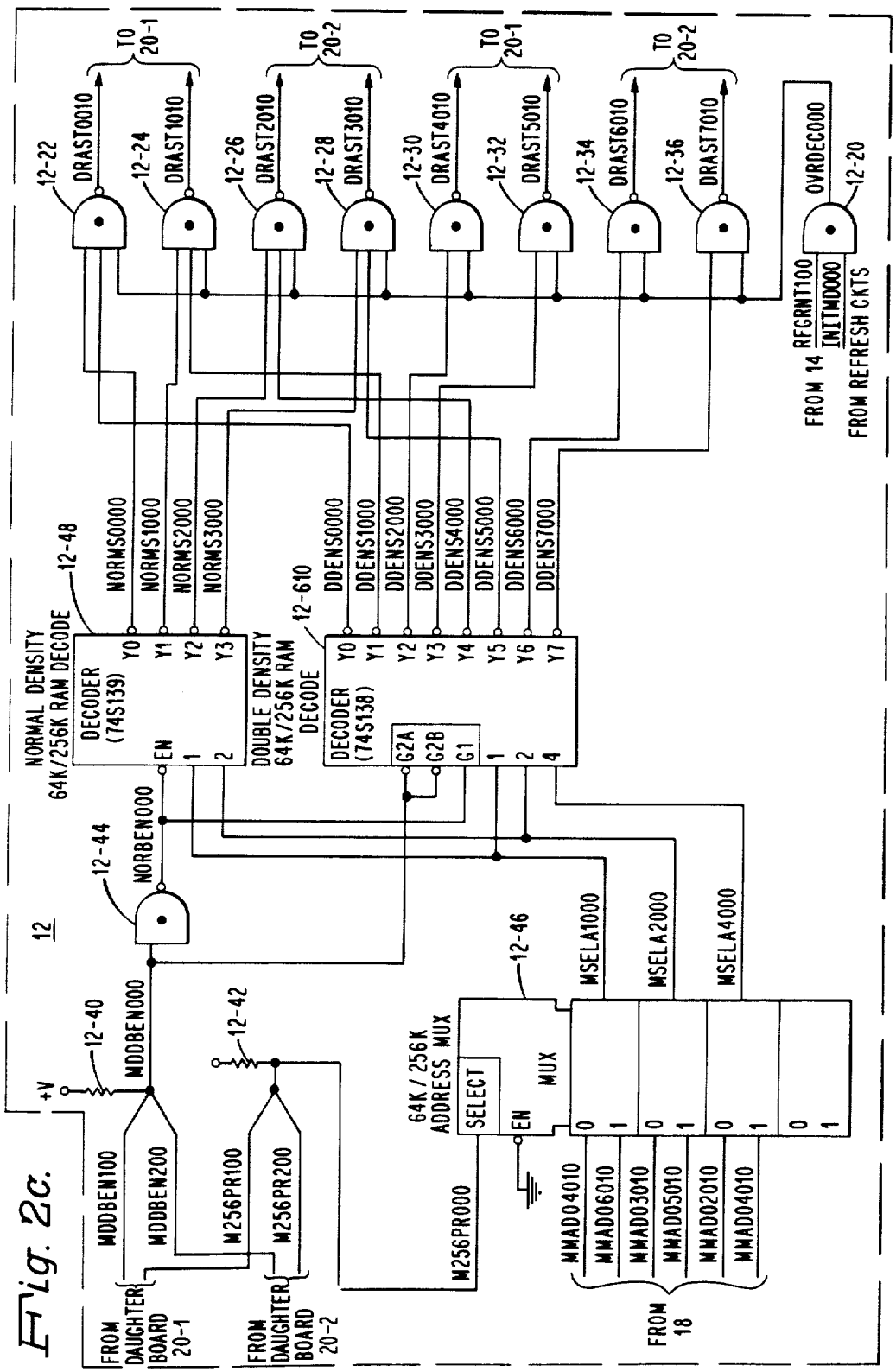

The chip type and memory decoder circuits of block 12, shown in greater detail in FIGS. 2a through 2c, generate a number of row address decode signals in response to selected combinations of address signals received from the circuits of block 18 as a function of the signals received from daughter boards 20-1 and 20-2. The circuits of block 12 apply selected different ones of these signals to daughter boards 20-1 and 20-2.

Each of the daughter boards 20-1 and 20-2 is identical in design and construction. Accordingly, it will be necessary only to describe one daughter board in detail. The single memory daughter board of the present invention is constructed to be used with different types of memory parts as discussed herein. To accomplish this, the board is designed (etched) to accommodate the maximum size memory chip. Those areas requiring different arrangements of signals such as addressing are configured or wired in place on the board.

As seen from FIG. 1, each daughter board includes a memory section (i.e., sections 24-1 and 24-2), a chip type and density identification section (i.e., sections 26-1 and 26-2) and an input/output connector (i.e., connectors 22-1 and 22-2). The memory section contains up to four rows of 64K or 256K (1K=1,024) bit dynamic RAM chips.

Each memory section provides a maximum of 256K or 1,024K words of memory storage organized as four blocks of 64K or 256K words which include 16 data bits and six EDAC check bits. The 64K or 256K bit MOS dynamic RAM chips are conventional in design. They may take the form of the 65,536 word or 262,144 word by 1-bit chips, respectively, designated as 2164, manufactured by Intel Corporation, and MSM37256, manufactured by Oki Semiconductor Corporation.

Each board identification section is wired or configured to identify the chip type and density characteristics of its associated memory section. Since the memory boards are identical, the output terminals of both sections are connected in common (i.e., wired ORed).

SINGLE BOARD COMPUTER 10

The different portions of memory board 10 pertinent to the present invention will now be considered in greater detail. Such portions are shown in FIGS. 2a through 4.

Chip Type & Density Decoder Circuits-12

FIGS. 2a through 2c show different embodiments of the decoder circuits of the present invention. Referring first to FIG. 2a, there is shown a plurality of decoder circuits 12-4 through 12-8 with associated input circuits including NAND gate 12-2, AND gate 12-20 and pull up load resistors 12-40 and 12-42 and output circuits including NAND gates 12-22 through 12-36 arranged as shown. This arrangement of decoder circuits provides the required sequence of decode row address strobe signals for addressing the maximum amount of memory (i.e., $2^{20}$).

The one megaword or two megabytes of addressable memory corresponds to four rows of 256K RAM chips. Thus, in this case, only one daughter board will be installed in the system when the daughter board is fully populated (all four rows) with 256K RAM chips.

In addition to constructing a daughter board with different memory parts, the board can be constructed to have one of two densities, normal/standard density or double density. A memory module board which is populated to contain twice the number of chips (i.e., chips in four rows) as a board having normal density (i.e., chips in two rows) is termed "double density". Stated differently, "standard or normal density" refers to a half populated memory module board while "double density" refers to a fully populated daughter board.

The decoder circuit 12-4 of FIG. 2a provides row decode output signals for two normal density daughter boards constructed from 64K RAM memory chips. The decoder circuit 12-6 provides row decode output signals for two double density daughter boards constructed from 64K RAM memory chips. The last decoder circuit 12-8 of FIG. 2a provides row decode output signals for two normal density daughter boards constructed from 256K RAM memory chips. Additionally, the same circuit provides row decode output signals for a single double density daughter board constructed from 256K RAM chips.

Each of the decoder circuits 12-4 through 12-8 receive selected ones of the signals MDDBEN100, MDDBEN200, M256PR100 and M256PR200 from the identification sections of daughter boards 20-1 and 20-2 and different combinations of address signals MMAD03010 through MMAD06010 from the address register circuits of block 18.

As shown in FIG. 2a, signals MDDBEN100 and MDDBEN200 are wire ORed together. The resulting signal MDDBEN000 identifies the density of both memory module boards. That is, when signal MDDBEN000 is at ground potential representative of a binary ZERO, this indicates that each of the memory module daughter boards installed in the system is double density (i.e., has four blocks/rows of memory). Conversely, when signal MDDBEN000 is at a +V voltage potential representative of a binary ONE, this indicates that each of the installed daughter boards is normal density (i.e., has two blocks/rows of memory).

Similarly, signals M256PR100 and M256PR200 are wire ORed together. The resulting signal M256PR000 identifies the type of memory chips contained on both memory module boards. When signal M256PR000 is at ground potential, a binary ZERO, this indicates that each installed daughter board contains 256K RAM chips. When signal M256PR000 is at a +V voltage potential, a binary ONE, this indicates that each of the installed daughter boards contains 64K RAM chips.

As seen from FIG. 2a, the NAND gate 12-2 combines both identification signals MDDBEN000 and M256PR000 to generate enabling signal 64KRAM000. When NAND gate 12-2 forces signal 64KRAM000 to a binary ZERO, decoder circuit 12-4 is enabled for decoding a first combination of input address signals MMAD06010 and MMAD05010 applied to its select input terminals. As a function of the coding of these address signals, decoder circuit 12-4 is conditioned to force one of its four output terminals Y0 through Y3 to a binary ZERO.

Each of the four decoder output terminals of circuit 12-4 is connected as an input to a different corresponding one of the NAND gates 12-22 through 12-28. Thus, when decoder circuit 12-4 forces signal 64KDC000 to a binary ZERO, NAND gate 12-22 is conditioned to force row decode signal DRAST0010 to a binary ONE.

A plurality of enabling input terminals G1 through G2A of decoder circuit 12-6 are connected to receive identification signals MDDBEN000 and M256PR000, as shown. When signal MDDBEN000 is a binary ZERO and signal M256PR000 is a binary ONE, decoder circuit 12-6 is enabled for decoding a second combination of input address signals MMAD06010 through MMAD04010 applied to its select input terminals. As a function of the coding of these address signals, decoder circuit 12-6 is conditioned to force one of its eight output terminals Y0 through Y7 to a binary ZERO.

Each of the eight decoder output terminals of circuit 12-6 is connected as an input to a different corresponding one of the NAND gates 12-22 through 12-36, as shown. Thus, when decoder circuit 12-6 forces signal D64DC0000 to a binary ZERO, NAND gate 12-22 is conditioned to force row decode signal DRAST0010 to a binary ONE.

The enabling input terminal of decoder circuit 12-8 is connected to receive signal M256PR000. When this signal is a binary ZERO, decoder circuit 12-8 is enabled for decoding a third combination of input address signals MMAD04010 and MMAD03010 applied to its select input terminals.

Each of the four output terminals of decoder circuit 12-8 is applied as an input to selected ones of the NAND gates 12-22 through 12-32. That is, output terminal Y0 connects to NAND gate 12-22 while output terminal Y1 connects to NAND gate 12-24 similar to the connections of the above discussed decoder circuits. However, output terminal Y2 connects to both NAND gates 12-26 and 12-30 while output terminals Y3 connects to both NAND gates 12-28 and 12-32. This arrangement enables the decoder 12-8 to generate the desired sequence of decode row address strobe signals when two standard density 256K RAM daughter boards or one double density 256K RAM daughter board is installed in the system.

Additionally, each of the NAND gates 12-22 through 12-36 receive as an input, an override decode signal OVRDEC000 from AND gate 12-20. During either a refresh cycle of operation or when the system is initialized, AND gate 12-20 forces signal OVRDEC000 to a binary ZERO. This conditions all of the NAND gates 12-22 and 12-36 to force all of the decode row address strobe signals to binary ONES. Thus, normally, AND gate 12-20 is conditioned to hold signal OVRDEC000 at a binary ONE.

FIGS. 2b and 2c show arrangements which provide an expanded addressing capability. That is, each provides the required sequence of decode row address strobe signals for addressing a maximum amount of memory which corresponds to two megawords or four megabytes. In this case, two double density memory module daughter boards containing 256K RAM chips can be installed in the system. To provide this additional addressing capability, the number of memory address bits is increased by one bit.

Referring first to FIG. 2b, it is seen that a fourth decoder circuit 12-10 together with associated input NAND gates 12-12 and 12-14 have been added to the embodiment of FIG. 2a. The same reference numerals used in FIG. 2a are used in FIGS. 2b and 2c for identifying the same elements.

A plurality of enabling input terminals G1 through G2A of decoder circuit 12-10 are connected to receive identification signals M256PR000 and 256RAM000. Signal M256PR000 is applied directly to enabling terminals G2A and G2B while signal MDDBEN000 is combined with the complement of signal M256PR000 in NAND gate 12-14. The resulting signal 256RAM000 is applied to the enabling terminal G1. Additionally, the same signal is used as the enabling signal for decoder circuit 12-8 as explained herein.

When signal M256PR000 is forced to a binary ZERO and NAND gate 12-14 forces signal 256RAM000 to a binary ONE in response to signal MDDBEN000 being at a binary ZERO, decoder circuit 12-10 is enabled for decoding a fourth combination of input address signals MMAD04010 through MMAD02010 applied to its select input terminals. As a function of the coding of these address signals, decoder circuit 12-10 is conditioned to force one of its eight output terminals Y0 through Y7 to a binary ZERO.

Each of the eight decoder output terminals of circuit 12-10 is connected as an input to a different corresponding one of the NAND gates 12-22 through 12-36 as shown. Thus, when decoder circuit 12-10 forces signal D256DC000 to a binary ZERO, NAND gate 12-22 is conditioned to force row decode signal DRAST0010 to a binary ONE.

With the expanded memory address capability, each of the output terminals of decoder circuit 12-8 now connect to different corresponding one of the NAND gates 12-22 through 12-28. That is, output terminals Y2 and Y3 no longer connect to NAND gates 12-30 and 12-32, respectively. When signal 256RAM000 is forced to a binary ZERO by signal M256PR000 being a binary ZERO and signal MDDBEN000 being a binary ONE, decoder circuit 12-8 is enabled to decode the same third combination of address signals MMAD04010 and MMAD03010 in the same manner as discussed above.

FIG. 2c shows another embodiment for providing the expanded address capability. The embodiment reduces the number of decoder circuits by one-half and utilizes an address multiplexer circuit 12-46 for selecting the different desired combinations of address signals applied to the select input terminals of the decoder circuits under the control of chip type identification signal M256PR000. As seen from FIG. 2c, the arrangement includes a normal density decoder circuit 12-48 and a double density decoder circuit 12-610. Each of the output terminals of both decoder circuits connects to a different corresponding one of the NAND gates 12-22 through 12-36 as shown.

The enabling input terminal of decoder circuit 12-48 receives the complement or inversion of signal MDDBEN000 via an input NAND gate 12-44. This signal NORBEN000 is also applied to the G1 input terminal of decoder 12-610. Additionally, the G2A and G2B input terminals of decoder circuit 12-610 receive signal MDDBEN000. The select input terminals of decoder circuit 12-48 and the first two select input terminals of decoder circuit 12-610 are connected to receive signals MSELA1000 and MSELA2000 from multiplexer circuit 12-46. The third select input terminal of decoder circuit 12-610 is connected to also receive signal MSELA4000 from multiplexer circuit 12-46.

The multiplexer circuit 12-46 has its select input terminal connected to receive signal M256PR000 while its first three pairs of input terminals are connected to receive different combinations of address signals MMAD02010 through MMAD06010 as shown. Since its enable input terminal connects to ground, the circuit 12-46 is always enabled for operation.

When normal density signal NORBEN000 is a binary ZERO, decoder circuit 12-48 is enabled for decoding a first or second combination of address signals selected as a function of the state of chip type signal M256PR000. That is, when signal M256PR000 is a binary ZERO, the decoder circuit 12-48 decodes address signals MMAD04010 and MMAD03010. Conversely, when signal M256PR000 is a binary ONE, decoder circuit 12-48 decodes address signals MMAD06010 and MMAD05010.

However, when normal density signal NORBEN000 is a binary ONE, in which case signal MMBEN000 is a binary ZERO, decoder circuit 12-610 is enabled for decoding third or fourth combinations of address signals selected as a function of the state of chip type signal M256PR000. That is, when signal M256PR000 is a binary ZERO, decoder circuit 12-610 decodes address signals MMAD02010 through MMAD04010. Conversely, when signal M256PR000 is a binary ONE, decoder circuit 12-610 decodes address signals MMAD04010 through MMAD06010. It will be appreciated that while the arrangement reduces the amount of chips considerably, there is some increase in circuit delay produced by selecting combinations of signal using address multiplexer circuit 12-46.

Memory Timing and Control Circuits 14

FIG. 3 shows in greater detail, a portion of the memory timing and control circuits of block 14. These circuits generate the row address strobe and column address strobe timing signals MRASTS010 and MCASTS010 which are applied to each of the chips of the rows of chips contained within the memory sections of daughter boards 20-1 and 20-2. Additionally, these circuits generate the address register control signals MCASI0000 and MRASI000 which enable the memory address signals of a memory request to be applied to the rows of chips of daughter boards 20-1 and 20-2.

As seen from FIG. 3, the circuits of block 14 include a delay line timing generator 14-2, conventional in design, and a plurality of buffer-inverter circuits 14-4 through 14-8, each of which is connected to receive a different one of a plurality of timing signals DLY020000 through DLY100000 from generator 14-2.

The circuits of block 14 further include a plurality of AND gates 14-10 through 14-14, a pair of NAND gates 14-16 and 14-18 and an inverter circuit 14-20, each of which connect to the output terminal of one of the buffer inverter circuits 14-4 through 14-8 as shown.

In greater detail, buffer and inverter circuit 14-4 in response to a negative going timing pulse signal DLY02000 conditions AND gate 14-10 to generate row address strobe signal MRASTS010. The signal MRASTS010 is a positive going pulse signal which is generated at the beginning of a memory cycle (i.e., at time 0) in response to signal MCYCLE010, generated by tie breaking circuits, not shown, included within the system. In general, it has a pulse width from 240 to 260 nanoseconds.

The buffer and inverter circuit 14-6 in response to negative going timing pulse signal DLY100000 conditions AND gate 14-12 in the absence of a memory refresh cycle (i.e., when signal RFGRNT100 is a binary ONE), to generate column address strobe signal MCASTS010. The signal MCASTS010 is a positive going pulse signal which is generated approximately 65–75 nanoseconds after the start of a memory cycle or after the start of row address strobe signal MRASTS010. It has a pulse width from 210 to 230 nanoseconds.

The buffer and inverter circuit 14-8 in the absence of negative going timing pulse signal DLY060000 conditions inverter circuit 14-20 to force row address time signal RASTME010 to a binary ONE. Signal RASTME010 conditions NAND gate 14-18 to force signal MRASI0000 to a binary ZERO. This enables the address register circuits of block 18 to apply the row address signals to the rows of RAM chips on daughter boards 20-1 and 20-2. At that time, signals IOGRNT010 and RFGRNT100 generated by the memory tie breaking circuits are both binary ONES.

When circuit 14-8 forces signal DLY060110 to a binary ONE in response to negative going timing pulse signal DLY060000, AND gate 14-14 is conditioned to force column address time signal CASTME010 to a binary ONE in the absence of a refresh cycle (i.e., signal RFGRNT100 is a binary ONE). At that time, signal RASTME010 is forced to a binary ZERO. Signal CASTME010 conditions NAND gate 14-16 to force signal MCASI0000 to a binary ZERO. This enables the address register circuits of block 18 to apply the column address signals to the rows of RAM chips on daughter boards 20-1 and 20-2. At this time, signal IOGRNT010 is a binary ONE.

Additionally, the circuits of block 14 provide signals IOGRNT000, RFGRNT010 and MEACKR710 as further inputs to the circuits of block 18. Signals IOGRNT000 and RFGRNT010 are also generated by the memory tie breaking circuits, while memory acknowledgement signal MEACKR710 is generated by the memory response circuits, not shown. For the purpose of the present invention, signals IOGRNT010, RFGRNT100 and MEACKR710 can be assumed to be binary ONES during a memory cycle of operation at which time signal MYCYCLE010 is forced to a binary ONE. For further information about how these signals are generated, reference may be made to the copending application of David A. Boudreau and Edward R. Salas, titled "Priority Resolver with Lowest Priority Priority Level Having Shortest Logic Path", bearing Ser. No. 449,703, filed on Dec. 14, 1982 and assigned to the same assignee as named herein.

The last signal shown in FIG. 3 is read/write signal WTMODE100. This signal is derived from the type of memory request received by the system. That is, in the case of a memory request specifying a memory read cycle of operation, signal WTMODE100 is forced low to a binary ZERO. However, when the request specifies a write cycle of operation, signal WTMODE100 is forced high to a binary ONE. For the purpose of the present invention, the circuits generating signal WTMODE100 can be considered conventional in design.

Address Register Circuits 18

Figure 4:
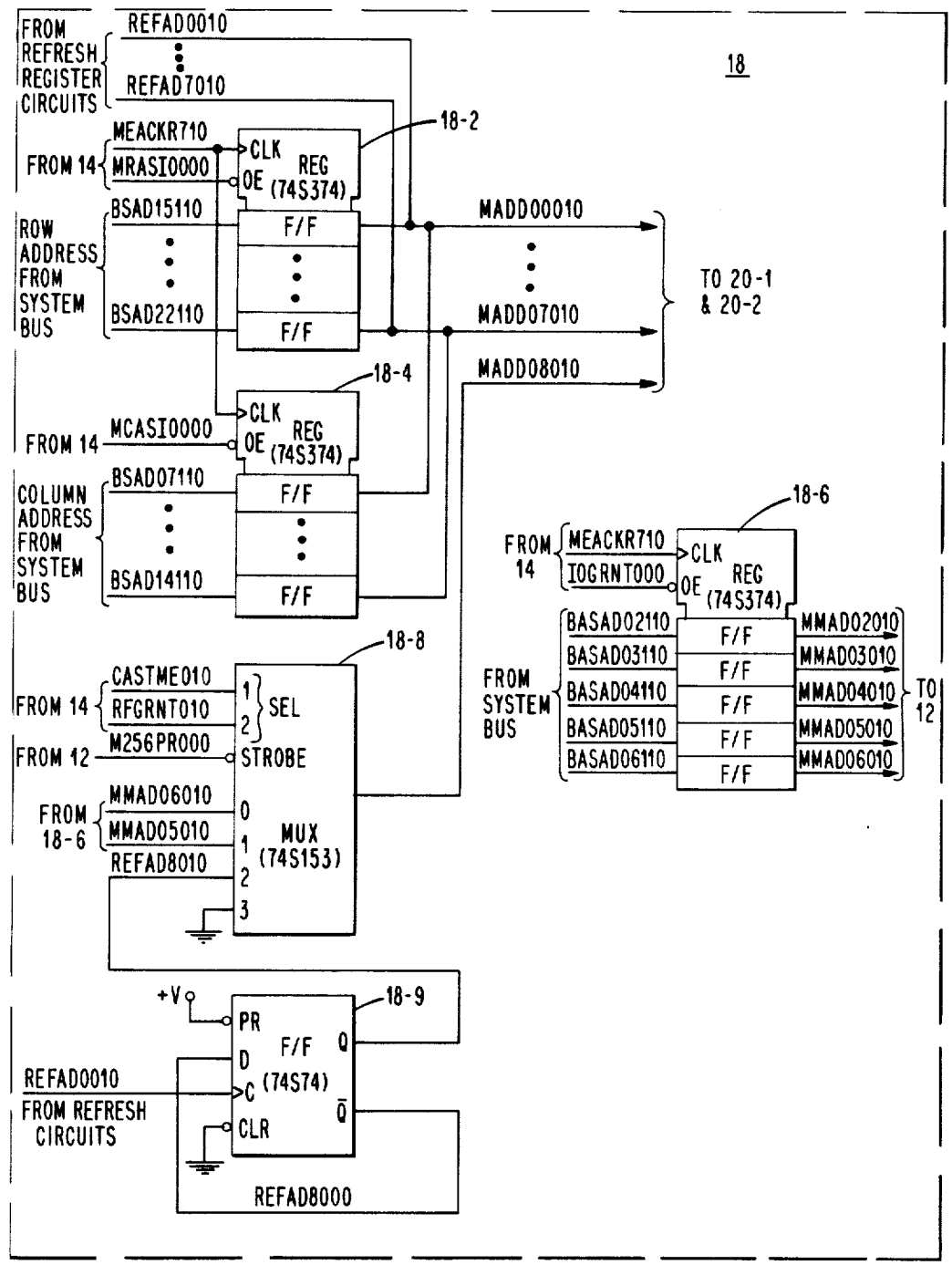

FIG. 4 shows in greater detail, a portion of the address register circuits of block 18. As shown, these circuits include three 8-bit D-type address registers 18-2 through 18-6, a multiplexer circuit 18-8, and a flip-flop circuit 18-9. Each of the registers 18-2 through 18-6 receive different portions of the memory request address from the system bus. More specifically, address register 18-2 receives address bits 15-22 which correspond to the row address part of the memory address which has the format shown in FIG. 6. Address register 18-4 receives address bits 7-14 which correspond to the column address part of the memory address. The third address register 18-6 receives address bits 2-6 of the memory address. The memory address bit 2 is only included in the case of a memory system which has an expanded memory addressing capability (i.e., two megawords).

As seen from FIG. 4, each of the three registers receive memory acknowledge signal MEACKR710 as an input clocking signal. Address register 18-2 stores the row address signals applied to its input terminals when signal MEACKR710 goes positive. The address contents of register 18-2 are applied to its output terminals when output enable signal MRASI0000 is forced to a binary ZERO by the circuits of block 14.

Similarly, address register 18-4 is conditioned for storing the column address signals applied to its input terminals when signal MEACKR710 goes positive. The register 18-4 applies its address contents to its output terminals when signal MCASI0000 is forced to a binary ZERO by the circuits of block 14. Lastly, address register 18-6 is conditioned on the positive going edge of signal MEACKR710 to store the memory block or segment address signals. When signal IOGRNT000 is forced to a binary ZERO by circuits 14, register 18-6 applies the stored address signals to its output terminals.

The multiplexer circuit 18-8 and flip-flop 18-9 together provide the value of the ninth address bit for each row and column address used to address daughter boards containing rows of 256K RAM chips. The multiplexer circuit 18-8 when enabled by signal M256PR000 being forced to a binary ZERO generates signal MADD08010 as a function of the states of signals CASTME010 and RFGRNT010. That is, during row address time, in the absence of a refresh cycle, both signals CASTME010 and RFGRNT010 are binary ZEROS. Therefore, multiplexer circuit 18-8 selects signal MMAD06010 applied to data input terminal 0 as the signal to be applied to its output terminal. Thus, address bit 6 is used as the ninth address bit of a 9-bit row address. However, during column address time in the absence of a refresh cycle, signal CASTME010 and signal RFGRNT010 are binary ONE and binary ZERO, respectively. This causes multiplexer circuit 18-8 to select signal MMAD05010 applied to data input terminal 1 as an output. Thus, address bit 5 is used as the ninth address bit of a 9-bit column address.

In the case of a refresh cycle of operation, during row address time, signal CASTME010 is a binary ZERO while signal RFGRNT010 is a binary ONE. This causes multiplexer circuit 18-8 to select signal REFAD8010 applied to data input terminal 2 as an output. Thus, signal REFAD8010 generated by flip-flop 18-9 used as the ninth bit of the refresh row address signals REFAD0010 through REFAD7010 provided by the memory refresh address circuits, not shown. Flip-flop 18-9 is connected to complement its state upon each occurrence of signal REFAD0010.

For the purposes of the present invention, the refresh address circuits can be considered conventional in design. They operate to provide a desired sequence of address signals for refreshing the rows of RAM chips contained on daughter boards 20-1 and 20-2. During column address time of a refresh cycle of operation, an all ZERO column address is provided. At that time, both signals CASTME010 and RFGRNT010 are binary ZEROS. This causes multiplexer circuit 18-8 to select the binary ZERO applied to data terminal 3 as an output. This completes the generation of all ZERO 9-bit column address.

It will be appreciated that the different portions of board 10 can be constructed from standard integrated circuit chips. Examples of these chips are designated within the particular blocks in the different drawings (e.g. FIG. 2a-74S138-decoder circuit 12-6, FIG. 3-74S240-circuits 14-4, etc., and FIG. 4-74S374-register 18-2, etc.).

MEMORY MODULE DAUGHTER BOARDS 20-1 AND 20-2

FIG. 5 shows in greater detail, memory module boards constructed according to the teachings of the present invention. Since each of the memory module boards is identical in construction as discussed above, only one memory board 20-1 is shown in complete detail.

As seen from FIG. 5, each memory module daughter board 20-1 includes I/O connector 22-1 which plugs into the corresponding one of the sockets of board 10. Only those signals which assist in understanding the present invention are shown with specificity.

As discussed above, the board 20-1 also includes a chip type and density identification section 26-1 and a memory section 24-1. As seen from FIG. 5, identification section 26-1 includes a pair of jumper connections A00A and A00B used for generating identification signals MDDBEN000 and M256PR000. These signals are generated according to the jumper configurations shown in FIG. 7.

More specifically, when the daughter board 20-1 is fully populated to provide four blocks or rows of memory chips (i.e., a double density board), the jumper A00A is wired in place. This results in signal MDDBEN000 being forced to ground which corresponds to a binary ZERO due to the grounding of one end of the jumper terminal. However, when daughter board 20-1 is half populated to provide two blocks or rows of memory chips (i.e., a single density board), jumper A00A is omitted. Thus, the terminal providing signal MDDBEN000 is allowed to float (i.e., no ground). Since the other side of connector 22-1 connects to a voltage +V through pull up resistor 12-40, signal MDDBEN000 assumes a +V value which corresponds to a binary ONE.

Figures 6, 7:
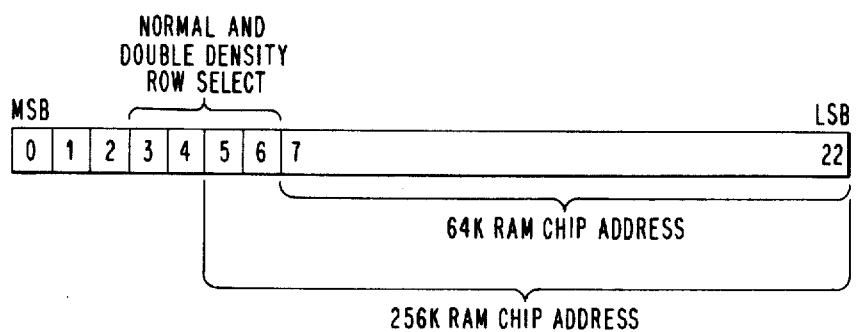
FIG. 6 illustrates the format of a memory address word used in accessing a memory location.
FIG. 7 illustrates the different types of memory module boards usable in the system of FIG. 1.

It is also seen from FIG. 7 that when daughter board 20-1 is populated with 256K RAM chips, jumper A00B is wired into place. In the same manner as discussed above, this results in signal M256PR000 being forced to a binary ZERO. However, when daughter board 20-1 is populated with 64K RAM chips, jumper A00B is omitted. This results in signal M256PR000 being forced to a binary ONE.

The remaining jumper configurations shown in FIG. 7 relate to the addressing of 65K and 256K RAM chips. More specifically, they collectively define the value of the ninth address bit relative to refresh operations which corresponds to signal MADE08010. That is, when daughter board 20-1 is populated with 64K RAM chips, jumper A00C is wired in place while jumper A00D is omitted as part of memory section 24-1. This results in signal MADE08110 having a binary ZERO value due to the grounding of one end of jumper A00C. This causes an inverter circuit 246 to force signal MADE08100 high or to a binary ONE. By maintaining the refresh enable terminal (RFE) of each chip high, refresh operations can be externally controlled by the circuits of board 10.

However, when daughter board 20-1 is populated with 256K RAM chips, jumper A00C is omitted while jumper A00D is wired in place. Therefore, signal MADE08010 is allowed to assume the state of signal MADD08010 received from the address register circuits of block 18.

As seen from FIG. 5, the main part of memory section 24-1 consists of four rows of memory chips designated as row 0 through row 3. As previously mentioned, the four rows may be constructed from either 64K RAM chips or 256K RAM chips. All of the memory chips of rows 0-3 are connected to receive column address select (CAS) timing signal MCAST0010. This signal is the complement or inversion of signal MCASTS010 received from connector 22-1 via a NAND gate 248.

Additionally, the chips of each row receive a specified one of the decode row address strobe signals DRAST0010 through DRAST5010. As shown, each of the signals DRAST0010 through DRAST5010 is combined with row address select (RAS) timing signal MRASTS010 within a corresponding one of the NAND gates 250 through 256. Each of the resulting signals DRASE0100 through DRASE3100 is applied to RAS input terminals of all of the chips of a specified one of the rows 0-3. That is, signal DRASE0100 is applied to the RAS input terminals of the chips located in row 0, signal DRASE1100 is applied to the RAS input terminals of all of the chips located in row 1, signal DRASE2100 is applied to the RAS input terminals of all of the chips located in row 2 and signal DRASE3100 is applied to the RAS input terminals of all of the chips located in row 3.

All four rows of the memory chips are connected to receive write control signal WTMODE100 from the circuits of block 14. This signal corresponds to signal MREAD0010 and is applied to the WE input terminals of all of the memory chips as shown. The address input terminals 0-7/8 of each RAM chip are connected to receive 8- or 9-bit row and column address portions of each memory address via I/O connector 22-1 from the circuits of block 18. The signals MADD00010 through MADD08010 are inverted via a corresponding number of inverter circuits of blocks 246 and 247 and applied as signals MADE00000-MADE08000 to the chips input address terminals.

Additionally, the 16 data bits and six EDAC check bits of each data word to be written into section memory 24-1 during each memory write cycle of operation are applied via I/O connector 22-1 to the data input (DI) terminals of the memory chips of each row. The 16 data bits and six EDAC check bits of each data word to be read out from memory section 24-1 during each memory read cycle of operation are applied by the data out (DO) terminals of the memory chips of each row to I/O connector 22-1 for transfer to the system bus.

Daughter board 20-1 has the same construction when it is populated for normal density rather than double density as shown in FIG. 5. The only difference is that memory section 24-1 will not have chips in rows 2 and 3. Therefore, signals DRAST4010 and DRAST5010 have no effect on memory operations.

The above is true for board 20-2. It will also be noted from FIG. 5 that when installed, daughter board 20-2 is connected to receive signals DRAST2010 through DRAST7010 which are applied to different ones of the NAND gates 250 through 256 of the board. Thus, the identically constructed board responds to the different selected group of decode row strobe signals. When daughter board 20-2 is populated for normally density, memory section 24-2 will not have chips in rows 2 and 3. Therefore, signals DRAST6010 and DRAST7010 have no effect on memory operations.

For the sake of completeness, memory presence signals ONEDTR000 and TWODTR000 are shown. Each of these signals is forced to ground, representative of a binary ZERO, when the daughter board associated therewith is plugged into the system. Both signals are forwarded to the circuits of board 10 where they are used along with the other identification signals to ensure that a valid memory location within the memory system is being addressed. For further information regarding the use of the memory presence signals, reference may be made to the related copending patent application of Daniel A. Boudreau and Edward R. Salas, referenced in the introductory portion of this application.

DESCRIPTION OF OPERATION

With reference to FIGS. 1–7 and the diagrams of FIGS. 8a through 8d, the operation of the preferred embodiments of the present invention will now be described.

Figure 8A:
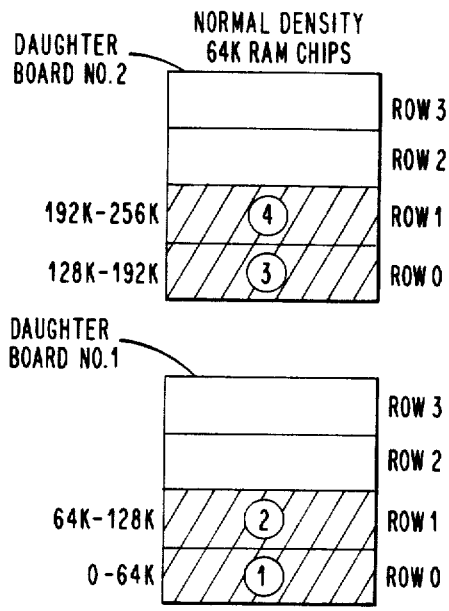
FIGS. 8a through 8d illustrate the construction of the module boards of FIG. 1 according to the teachings of the present invention.

FIG. 8a shows the construction of memory module boards 20-1 and 20-2 with normal density using 64K RAM memory chips. As shown, each board includes 64K RAM chips positioned in rows 0 and 1. Both boards provide a memory addressing capability of 256K words. In this arrangement, when board 20-1 is installed, the chips of rows 0 and 1 are connected to receive decode row strobe signals DRAST0010 and DRAST1010, respectively. When board 20-2 is installed, the chips of rows 0 and 1 are connected to receive diode row strobe signals DRAST2010 and DRAST3010, respectively. The identification sections 26-1 and 26-2 are configured to exclude jumpers A00A and A00B according to FIG. 7. Hence, the identification sections 26-1 and 26-2 force both signals MDDBEN000 and M256PR000 to binary ONES.

Also, jumper A00C is wired in place while jumper A00D is omitted from memory sections 26-1 and 26-2 of the boards. This permits external control of refresh operations.

By way of example, it is assumed that a series of four memory requests are applied to the memory by the system bus requesting the read out of words from successive segments or blocks of memory. The addresses contained within the requests have the format of FIG. 6 and correspond to valid memory locations (i.e., present in the system).

The first such memory request is assumed to have an all ZERO memory address. Different portions of the memory address are loaded into address registers 18-2 through 18-6 of FIG. 4 at the beginning of the memory cycle signalled by signal MEACKR710 going positive in response to the memory system's receipt of a valid request.

Since signal M256PR000 is a binary ONE, multiplexer circuit 18-8 is disabled. Hence, signal MADD08010 which corresponds to the ninth address bit has been effectively omitted.

It can be assumed that signal IOGRNT000 is a binary ZERO at the start of the memory cycle. Hence, address register 18-6 is conditioned to apply memory address bits 2-6 to the decoder circuits of block 12 as signals MMAD02010 through MMAD06010. Referring to FIG. 2a, it is seen that since both signals MDDBEN000 and M256PR000 are binary ONES, NAND gate 12-2 is conditioned to force signal 64KRAM000 to a binary ZERO.

Upon being enabled for operation by signal 64KRAM000, decode circuit 12-4 operates to decode address signals MMAD06010 and MMAD05010. Since both these signals are binary ZEROS, decoder circuit 12-4 forces output signal 64KDC0000 to a binary ZERO. This causes NAND gate 12-22 to force row decode signal DRAST0010 to a binary ONE state. As seen from FIGS. 2a and 5, this signal is applied via I/O connector 22-1 as an input to memory section 24-1.

Also, at the beginning of the memory cycle, the circuits of block 14 operate to force memory row address signal MRASI0000 to a binary ZERO. That is, referring to FIG. 3, it is seen that initially, signal DLY060000 is high and goes low during the memory cycle. Therefore, signal DLY060110 is a binary ZERO which causes inverter circuit 14-20 to force signal RASTME010 to a binary ONE. Since both signals IOGRNT010 and RFGRNT100 are binary ONES, NAND gate 14-18 is conditioned by signal RASTME010 to force signal MRASI0000 to a binary ZERO.

Therefore, at the start of the memory cycle, signal MRASI0000 causes address register 18-2 of FIG. 4 to apply the all ZERO row address bits 15-22 of the memory address to its output terminals as signals MADD00010 through MADD07010. These row address signals are applied via I/O connectors 22-1 and 22-2 to the address input terminals of each of the chips of rows 0 and 1 of both boards 20-1 and 20-2.

Therefore, as soon as the decoder circuits of block 12 force signal DRAST0010 to a binary ZERO, this partially conditions NAND gate 250 of FIG. 5. NAND gate 250 is fully conditioned when the circuits of block 14 force row address strobe timing signal MRASTS010 to a binary ONE. As seen from FIG. 3, this happens when generator 14-2 generates negative going pulse signal DLY020000.

Upon being fully conditioned, NAND gate 250 of FIG. 5 forces signal DRASE0100 to a binary ZERO. This, in turn, causes all of the chips of row 0 and board 20-1 to store the all ZEROS row address signals MADE07010-0010 corresponding to memory address bits 15-22 in row address buffer circuits internal to the chips. This completes the first half of an access cycle.

That is, each 64K memory chip contains a number of storage arrays organized in a matrix of rows and columns of storage cells (e.g. 256×256, 128×512, etc.). In this embodiment, it will be assumed that the 64K chip matrix is organized to have 256 rows by 256 columns. Accessing one of the 65,536 (64K) storage locations of a chip is accomplished in two steps as discussed herein. In the first step or during a first half of an access cycle, 256 storage locations of a complete row are applied to 256 columns of sense amplifier circuits located on the chip. In a second step or during a second half of the cycle, one of the 256 columns of sense amplifier circuits is read out to the chip's data out terminal Do. For further information regarding the internal operation of 64K chips, reference may be made to the publication titled "The MOS Memory Data Book" by Texas Instruments Incorporated, Copyright 1980.

The generation of row address strobe signal MRASTS010 is followed 65–75 nanoseconds later by the generation of column address strobe timing signal MCASTS010. As seen from FIG. 3, when generator 14-2 forces signal DLY100000 low, this causes in AND gate 14-12 to force signal MCASTS010 to a binary ONE.

However prior to that, generator 14-2 forces signal DLY060000 low. This causes AND gate 14-14 to force column address strobe timing signal to a binary ONE while at the same time causing inverter circuit 14-20 to force row address timing signal MRASTI0000 to a binary ZERO. This results in NAND gate 14-16 forcing memory column address strobe signal MCASI0000 to a binary ZERO while NAND gate 14-18 forces memory row address signal MRASI0000 to a binary ONE.

As seen from FIG. 4, signal MCASI0000 when a binary ZERO conditions column address register 18-4 to apply the all ZERO column address bits 7-14 to its output terminals as signals MADD00010 through MADD07010. Since signal M256PR000 is a binary ONE, multiplexer circuit 18-8 remains disabled. Thus, after 75 nanoseconds, the 8-bit row address is replaced by the 8-bit column address. When column address strobe timing signal MCASTS010 is forced to a binary ONE, NAND gate 248 of FIG. 5 on each of the boards 20-1 and 20-2 force signal MCAST0010 to a binary ZERO. At that time, the 8-bit all ZEROS column address is latched into the column buffer circuits internal to all of the chips of rows 0–4 of boards 20-1 and 20-2. This completes the second part of the access cycle.

The result that during the read cycle of operation (i.e., when signal MREAD0010 is a binary ONE) bit location 0 of the 64K bit locations of each chip is read out to the data out terminal of each of the chips of row 0 of board 20-1. The resulting 22-bit word consisting of 16 data and six EDAC check bits is forwarded to the system bus via I/O connector 22-1.

With the exception of the circuits of block 12, the operation of the circuits of FIG. 1 for the most part can be considered the same for processing the remaining memory requests. Therefore, such discussion will be omitted herein. It is assumed that the remaining memory requests in the series of requests are coded to have all ZERO addresses with the possible exception of address bits 5 and 6. In the next memory request, it is assumed that address bits 6 and 5 have the value "01".

As seen from FIG. 2a, decoder circuit 12-4, in response to the "01" values of signals MMAD06010 and MMAD05010, forces signal 64KDC1000 to a binary ZERO. This causes NAND gate 12-24 to force decode row address strobe signal DRAST1010 to a binary ONE.

As seen from FIG. 5, upon the generation of memory row address strobe timing signal MRASTS010 by the circuits of block 14, NAND gate 252 is conditioned by signal DRAST1010 to force signal DRASE1100 to a binary ZERO. This causes all of the chips of row 1 of board 20-1 to store the row address signals MADE07010-0010 in row address buffer circuits internal to the chips. Accordingly, at the end of the access cycle, bit location 0 of each of the chips of row 1 is read out and transferred to the system bus via I/O connector 22-1.

When a further memory request is received in which address bits 6 and 5 have the value "10", decoder circuit 12-4 forces signal 64KDC2000 to a binary ZERO. This causes NAND gate 12-26 to force decode row address strobe signal DRAST2010 to a binary ONE.

As seen from FIG. 5, NAND gate 250 within memory section 24-2 of board 20-2 forces decode row address strobe signal DRASE0100 to a binary ZERO when the circuits of block 14 force timing signal MRASTS010 to a binary ONE. This causes all of the chips of row 0 of board 20-2 to store the row address signals MADE07010-0010 in internal row address buffer circuits. Accordingly, at the end of the access cycle, the contents of bit location 0 within each of the chips of row 0 are read out and transferred to the system bus.

When a last memory request is received in which address bits 6 and 5 have the value "11", decoder circuit 12-4 forces signal 64KDC3000 to a binary ZERO. This causes NAND gate 12-28 to force decode row address strobe signal DRAST3010 to a binary ONE.

As seen from FIG. 5, NAND gate 252 of memory section 24-2 forces decode row address strobe signal DRASE1100 to a binary ZERO in response to signal MRASTS010 being switched to a binary ONE. This causes all of the chips of row 1 of board 20-2 to store row address signals MADE07010-0010 in internal row address buffer circuits. Accordingly, at the end of the access cycle, the contents of bit 0 location 0 within each of the chips of row 1 are read out and transferred to the system bus.

The above shows how a first decoder circuit of FIG. 2a operates to address successive rows of chips within normal density boards 20-1 and 20-2 as a function of identification signals M256PR000 and MDDBEN000 generated by identification sections 26-1 and 26-2 in response to the possible different values of a first selected combination of memory address bits. Addressing proceeds automatically through the different memory segments as indicated by numbers 1 through 4 in FIG. 8a, and does not require additional circuits and switches for establishing the segment or block of memory being addressed.

Figure 8C:
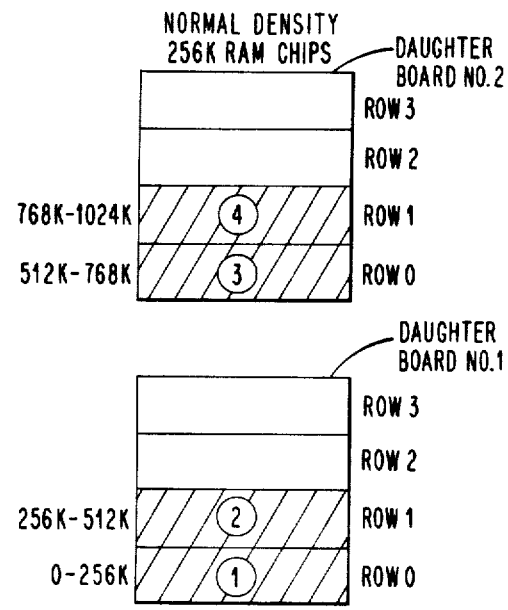
Figure 8B:
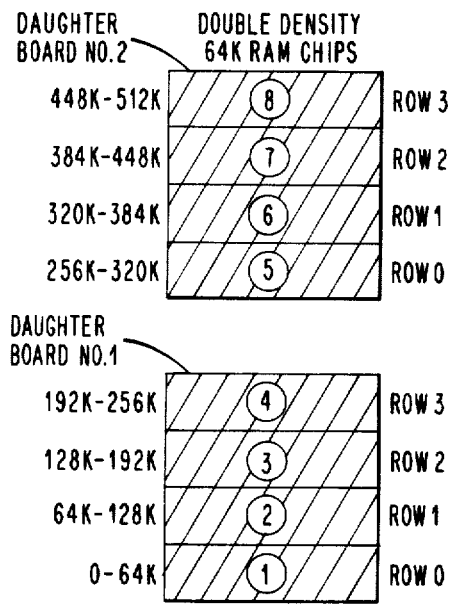

FIG. 8b shows the construction of memory module boards 20-1 and 20-2 with double density using 64K RAM chips. As shown, each board includes 64K RAM chips positioned in rows 0 through 3. Both memory boards provide a memory addressing capability of 512K words. When board 20-1 is installed, the chips of rows 0 through 3 are connected to receive decode row strobe signals DRAST0010 through DRAST5010. When board 20-2 is installed, the chips of rows 0 through 3 are connected to receive decode row signals DRAST2010 through DRAST7010. Since the boards are double density with 64K RAM chips, both identification sections 26-1 and 26-2 are configured to include jumper A00A and exclude jumper A00B according to FIG. 7. Hence, each of identification sections 26-1 and 26-2 forces signal MDDBEN000 to a binary ZERO and signal M256PR000 to a binary ONE. The remaining jumpers A00C and A00D are wired in the same way as the boards of FIG. 8a.

Again, it will be assumed that a series of eight memory requests are applied to the memory requesting the read out of words from successive blocks or rows of memory. Each memory request has an all ZERO address with the possible exception of address bits 4 through 6. In the case of first memory request, it is assumed that bits 4 through 6 have the value "000".

The different portions of the memory request address are stored in registers 18-2 through 18-6 of FIG. 4, and applied to the decoder circuits of FIG. 2a and the boards 20-1 and 20-2 as explained above. Referring to FIG. 2a, it is seen that since signal MDDBEN000 is a binary ZERO and signal M256PR000 is a binary ONE, decoder circuit 12-6 is enabled for decoding address signals MMAD06010 through MMAD04010. Since these signals are binary ZEROS, decoder circuit 12-6 forces output signal D64DC0000 to a binary ZERO. This causes NAND gate 12-22 to force decode row address strobe signal DRAST0010 to a binary ONE state.

In the manner previously described, NAND gate 250 of board 20-1 of FIG. 5 forces signal DRASE0100 to a binary ZERO. This enables all of the chips of row 0 to store the eight all ZERO row address signals MADE7010-0010 in the internal row address buffer circuits. The column address signals are then stored in a similar manner. The final result is that the read cycle of operation causes bit location 0 of the 64K bit locations of each chip of row 0 of the first daughter board to be read out and the resulting 22-bit word to be forwarded to the system bus.

Bits 4–6 of the second memory request are assumed to have the value "001". This causes decoder circuit 12-6 to force output signal D64DC1000 to a binary ZERO. This causes NAND gate 12-24 to force decode row address strobe signal DRAST1010 to a binary ONE state.

In the manner described above, NAND gate 252 of board 20-1 of FIG. 5 forces signal DRASE1100 to a binary ZERO. This enables all of the chips of row 1 to store the all ZERO row address signals MADE07000-0000 in the internal row address buffer circuits. Accordingly, the read cycle of operation causes bit location 0 of the 64K bit locations of each chip of row 1 of the first daughter board to be read out and the resulting 22-bit word to be forwarded to the system bus.

Bits 4–6 of the third and fourth memory requests are assumed to have the values "010" and "011", respectively. They cause decoder circuit 12-6 to force in succession output signals D64DC2000 and D64DC3000 to binary ZEROS. This causes NAND gates 12-30 and 12-32 in succession to force row decode signals DRAST4010 and DRAST5010 to binary ONES.

As seen from FIG. 5, signals DRAST4010 and DRAST5010 successively condition NAND gates 254 and 256 of the first board 20-1 to force signals DRASE2100 and DRASE3100 to binary ZEROS. Thus, all of the chips in row 2 and then in row 3 are conditioned to store the eight all ZERO row address signals MADE07000-0000 in their internal row address buffer circuits. Accordingly, by these successive read cycles result in words being read out from location 0 of the chips of rows 2 and 3 of the first board 20-1.

Bits 4–6 of the fifth and sixth memory commands are assumed to have the values "100" and "101", respectively. They cause decoder circuit 12-6 to force in succession output signals D64DC4000 and D64DC5000 to binary ZEROS. This causes NAND gates 12-26 and 12-28 in succession to force row decode signals DRAST2010 and DRAST3010 to binary ONES.

As seen from FIG. 5, signals DRAST2010 and DRAST3010 successively condition NAND gates 250 and 252 of second board 20-2 to force signals DRASE0100 and DRASE1100 to binary ZEROS. Thus, all of the chips in row 0 and then row 1 are conditioned to store the all ZERO row address signals MADE07000-0000 in their internal row address buffer circuits. The result is that the successive read cycles cause words to be read out from location 0 of the chips of rows 0 and 1 of the second board 20-2.

Bits 4–6 of the seventh and eighth memory commands are assumed to have the values "110 and "111", respectively. They cause decoder circuit 12-6 to force in succession output signals D64DC6000 and D64DC7000 to binary ZEROS. This causes NAND gates 12-34 and 12-36 in succession to force row decode signals DRAST6010 and DRAST7010 to binary ONES.

As seen from FIG. 5, signals DRAST6010 and DRAST7010 successively condition NAND gates 254 and 256 of second board 20-2 to force signals DRASE2100 and DRASE3100 to binary ZEROS. Thus, all of the chips in row 2 and then row 3 of the second daughter board 20-2 are conditioned to store the all ZERO row address signals MADE07000-0000 in their internal buffer circuits. The result is that the successive read cycles cause words to be read out from location 0 of the chips of rows 2 and 3 of board 20-2.

The above sequence of differently coded memory requests show how a second decoder circuit of FIG. 2a operates to address successive rows of chips within double density boards 20-1 and 20-2 as a function of identification signals M256PR000 and MDDBEN000. The rows are selected in response to the possible different values of a second selected combination of memory address bits. As described, addressing proceeds automatically through the different memory segments or rows as indicated by numbers 1 through 8 in FIG. 8b.

FIG. 8c shows the construction of normal density memory module boards 20-1 and 20-2 with 256K RAM chips. Each chip is organized in a matrix of internal rows and columns (e.g. 512×512, etc.). As shown, each board includes 256K RAM chips positioned in rows 0 and 1. Both memory boards provide a memory addressing capability of one megaword (1024K words). As in the case of FIG. 8a, when board 20-1 is installed, the chips of rows 0 and 1, respectively, are connected to receive decode row strobe signals DRAST0010 and DRAST1010. When board 20-2 is installed, the chips of rows 0 and 1 are connected to receive decode row strobe signals DRAST2010 and DRAST3010, respectively.

Since the boards are normal density with 256K RAM chips, both identification sections 26-1 are configured to exclude jumper A00A and to include jumper A00B according to FIG. 7. Hence, each of the identification sections 26-1 and 26-2 forces signal MDDBEN000 to a binary ONE and signal M256PR000 to a binary ZERO. Additionally, the remaining jumpers A00C and A00D are wired according to FIG. 7. That is, jumper A00C is excluded while jumper A00D is included. This applies as a ninth address bit, signal MADD08010 to the address input terminals of each of the chips of rows 0 and 1 of boards 20-1 and 20-2.

As in the case of FIG. 8a, it will be assumed that a series of four memory requests are applied to the memory specifying the read out of words from successive blocks or rows of memory. Each memory request has an all ZERO address with the possible exception of address bits 3 and 4. It is assumed that bits 3 and 4 of the first memory request have the value "00".

As previously explained, the different portions of the memory request address are stored in registers 18-2 through 18-6 of FIG. 4 applied to the decoder circuits of FIG. 2a and boards 20-1 and 20-2. More specifically, the row and column addresses are sequentially applied to the boards 20-1 and 20-2, as explained above. The ninth bit of each address is provided by multiplexer circuit 18-8. That is, since signal M256PR000 is a binary ZERO, multiplexer circuit 18-8 provides as an output, the input signal selected by the states of signals CAST- ME010 and RFGRNT010. During the first half of the access cycle (RAS time), since both signals are binary ZEROS, signal MMAD06010 is used as the ninth row address bit of the row address. During the second half of the access cycle (CAS time), the values of the signals are "01". Therefore, signal MMAD05010 is used as the ninth column address bit of the column address.

Referring to FIG. 2a, it is seen that since signal M256PR000 is a binary ZERO, decoder circuit 12-6 is enabled for decoding address signals MMAD04010 and MMAD03010. Since both signals are binary ZEROS, decoder circuit 12-8 forces output signal 256DC0000 to a binary ZERO. This causes NAND gate 12-22 to force decode row address signal DRAST0010 to a binary ONE state.

As seen from FIG. 5, this causes NAND gate 250 of the first daughter board 20-1 to force signal DRASE0100 to a binary ZERO. This enables all of the chips of row 0 to store the nine all ZERO row address signals MADE08000-0000 in the internal row address buffer circuits. This results in the read cycle of operation causing bit location 0 of the 256K bit locations of each chip of row 0 to be read out and the resulting 22-bit word to be forwarded to the system bus.

Bits 4 and 3 of the second memory request are assumed to have the value "01". This causes decoded circuit 12-8 to force output signal 256DC1000 to a binary ZERO. This causes NAND gate 12-24 to force decode row address strobe signal DRAST1010 to a binary ONE state.

In the above described manner, NAND gate 252 of board 20-1 of FIG. 5 forces signal DRASE1100 to a binary ZERO. This enables all of the chips of row 1 to store the nine all ZERO row address signals MADE08000-0000 in the internal row address buffer circuits. Accordingly, the read cycle of operation causes bit location 0 of the 256K bit locations of each chip of row 1 to be read out and transferred.

Bits 4 and 3 of the third and fourth memory requests are assumed to have the value "10" and "11", respectively. They cause decoder circuit 12-8 to force in succession output signals 256DC2000 and 256DC3000 to binary ZEROS. This causes NAND gates 12-26 and 12-28 in succession to force decode row address strobe signals DRAST2010 and DRAST3010 to binary ONES.

As seen from FIG. 5, signals DRAST2010 and DRAST3010 successively condition NAND gates 250 and 252 of the second daughter board 20-2 to force signals DRASE0100 and DRASE1100 to binary ZEROS. Thus, all of the chips in row 0 and then in row 1 are conditioned to store the nine all ZERO row address signals MADE08000-0000 in their internal row address buffer circuits. The result is that words are read out from location 0 of the chips of rows 0 and 1 of the second board 20-2.

The above shows how a third decoder circuit of FIG. 2a operates to address successive rows of chips within normal density boards 20-1 and 20-2 constructed with 256K RAM chips as a function of identification signal M256PR000 in response to possible different values of a third selected combination of memory address bits. Addressing proceeds automatically through the different memory segments or rows as indicated by numbers 1 through 4 in FIG. 8c.

Figure 8D:
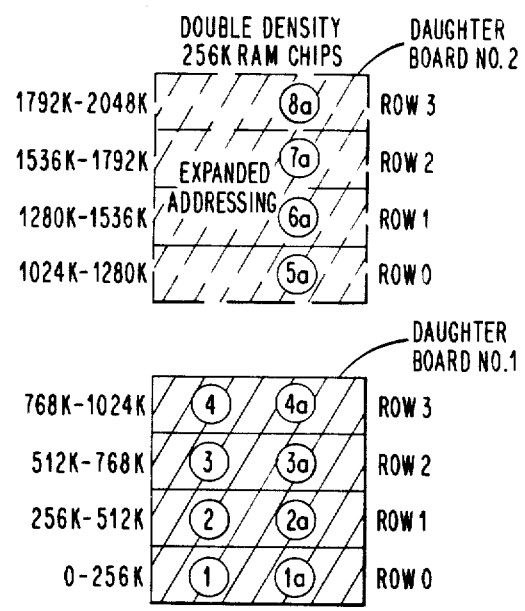

The bottom part of FIG. 8d shows the construction of double density memory module board 20-1 with 256K RAM memory chips. As shown, the board 20-1 includes 256K RAM chips positioned in rows 0 through 3. The memory board provides a memory addressing capability of one magaword, the same as FIG. 8b. When board 20-1 is installed, the chips of rows 0 through 3 are connected to receive decode row strobe signals DRAST0010 through DRAST5010 as shown in FIG. 5.

Since board 20-1 is double density with 256K RAM chips, identification section 26-1 is configured to include jumpers A00A and A00B according to FIG. 8. Hence, identification section 26-1 forces signals MDDBEN000 and M256PR000 to binary ZEROS. The remaining jumpers A00C and A00D are wired in the same way as the boards of FIG. 8c.

It will be assumed that the same series of four memory requests are applied to memory. Accordingly, decoder circuit 12-8 forces in succession output signals 256DC0000 through 256DC3000 to binary ZEROS. This in turn causes NAND gates 12-22 through 12-28 to force in succession decode row address strobe signals DRAST0010 through DRAST3010 to binary ONES. Since the second board 20-2 is not installed, decode row address strobe signals DRAST2010 and DRAST3010 have no effect on memory operation. Because signals 256DC2000 and 256DC3000 are also applied to NAND gates 12-30 and 12-32, respectively, decode row address strobe signals DRAST4010 and DRAST5010 are also successively forced to binary ONES.

Referring to FIG. 5, it is seen that NAND gates 250 through 256 of board 20-1 in succession force signals DRASE0100 through DRASE3100 to binary ZEROS. This enables all of the chips of rows 0-3 to store the nine row address signals MADE08000-0000 in the internal row address buffer circuits. Thus, in successive read cycles of operation, the contents of bit location 0 of the 256K bit locations of each chip of rows 0-3 are read out and the resulting 22-bit words are forwarded to the system bus.

The above shows how the third decoder circuit of FIG. 2a operates to address successive rows of chips within a single double density board 20-1 as a function of identification signal M256PR000. The rows are selected in response to the possible different values of the third selected combination of memory address bit. As described, addressing proceeds automatically through the different memory segments or rows as indicated by numbers 1 through 4 in the lower portion of FIG. 8d.

Both portions of FIG. 8d show the construction of double density memory module boards 20-1 and 20-2 with 256K RAM chips for a memory system having an expanded addressing capability. As shown, each board includes 256K RAM chips positioned in rows 0-3. Both memory boards provide a memory addressing capability of two megawords (2048 words).

As in the case of FIG. 8b, when board 20-1 is installed, the chips of rows 0 through 3 are connected to receive decode row strobe signals DRAST0010 through DRAST5010. When board 20-2 is installed, the chips of rows 0 through 3 are connected to receive decode row signals DRAST2010 through DRAST7010. Both identification sections 26-1 and 26-2 are wired the same as single board 20-1. That is, each of the identification sections 26-1 and 26-2 forces signals MDDBEN000 and M256PR000 to binary ZEROS. The remaining jumpers A00C and A00D are wired in the same way as described above.

Again, it will be assumed that a series of eight memory request are applied to the memory requesting the read out of words from successive blocks or rows of memory. Each memory request has an all ZERO address with the exception of address bits 2-4. Address bit 2 as discussed above is required for the expanded addressing capability.

The decoding arrangement of either FIG. 2b or FIG. 2c will be used for providing the expanded addressing capability.

In the case of FIG. 2b, identification signals MDDBEN000 and M256PR000, when binary ZEROS, cause NAND gates 12-12 and 12-14 fo force signal 256KRAM10 to a binary ONE. This in turn enables decoder circuit 12-10 and at the same time disables decoder circuit 12-8. When enabled, decoder circuit 12-10 decodes address signals MMAD04010 through MMAD02010.

It will be assumed that address signals MMAD04010 through MMAD02010 have the values "000" through "111". Therefore, in response to the series of eight memory requests, decoder circuit 12-10 in succession forces signals D256DC000 through D256DC7000 to binary ZEROS. This causes NAND gates 12-22 through 12-36 to force row decode signals DRAST0010 through DRAST7010 to binary ONES.

As seen from FIG. 5, NAND gates 250 thru 256 of board 20-1 and NAND gates 250 thru 256 of board 20-2 are successively conditioned to force signals DRASE0100 thru DRASE3100 of board 20-1 and signals DRASE0100 thru DRASE3100 of board 20-2 to binary ZEROS. The result is that all of the chips in rows 0 thru 3 of both boards are in turn conditioned to store 9-bit row address signals MADE08000-0000 within their internal row address buffer circuits. Accordingly, at the end of the cycles, the bit location of each of the chips of rows 0 through 3 of both boards are read out and transferred to the system bus. The succession of row addressing proceeds as shown by numbers 1a through 8a in FIG. 8c.

The same result is achieved when the same series of eight memory requests are decoded by the decoder circuits of FIG. 2c. That is, since signal M256PR000 is a binary ZERO, address bits 2-4 are applied to decoder circuit 12-610 for decoding. The decoder circuit 12-610 is enabled by the binary ZERO state of signal MDDBEN000. Accordingly, decoder circuit 12-610 operates to force in succession signals DDENS0000 through DDENS7000 to binary ZEROS. This in turn causes NAND gates 12-22 through 12-36 to force row decode signals DRAST0010 through DRAST7010 to binary ONES. Accordingly, the succession of row or segment addressing proceeds as shown by numbers 1a through 8a in FIG. 8d.

The above shows how the decoder circuits of FIGS. 2b and 2c operate to address successive rows of chips within double density 256K RAM boards 20-1 and 20-2 as a function of identification signals M256PR000 and MDDBEN000 in response to the different values of a selected combination of memory address bits.

From the above explanation, it is seen how the apparatus and method of the preferred embodiments of the present invention are able to automatically generate the desired sequence of row decode strobe signals for addressing locations within a function of identification signals provided by the identification sections included in the memory module boards installed in the system. The rows are selected in the sequence defined by the selected address bit combinations of a predetermined address portion of each memory request address.

This enables different density memory module boards constructed with different types of memory parts to be installed within the same memory system without requiring any changes to the system. That is, the addressable or memory address space does not have to be established. Also, no changes are required to be made to the circuits which control memory operations (e.g. timing circuits, address circuits, etc.).

It will be appreciated by those skilled in the art that the present invention may be utilized with other memory parts (e.g. programmable read only memory (PROM) parts, read only memory parts). Also, the invention may be used with different types of memory parts (e.g. 16K RAM chips, 1024K RAM chips, et.) and with other board densities.

Other changes may be made to the preferred embodiments, such as the type of decoder circuits, the number of address bits, the number of identification signals and memory module boards utilized within the memory system. Also, the identification section may be constructed in alternate ways, as for example, the desired connections may be etched onto each memory module board.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A memory system comprising a number of memory module boards and a main board coupled to said number of module boards, said main board including decoder circuit means for generating a number of decode selection signals in response to a predetermined multibit address portion of an address of each memory request applied to said system, said address being for specifying a location within said system to be accessed, each of said memory module boards including:

a memory section coupled to said decode circuit means for receiving selected ones of said decode selection signals, said memory section having a number of blocks of addressable memory chips, each block including a plurality of storage locations; and an identification section coupled to said decoder circuit means, said identification section including means for supplying a plurality of identification signals coded for indicating the type of chips and the populated density of said board, said decoder circuit means being conditioned by said identification signals for decoding different address bit combinations of said predetermined multibit address portion selected as a function of said coded identification signals to generate said number of said decode selection signals in a manner which enables successive addressing of said pluralities of storage locations within each of said blocks of said number of memory module boards.

2. The system of claim 1 wherein said predetermined multibit address portion corresponds to a number of most significant address bits coded for specfying a maximum number of blocks of memory chips includable on said number of memory boards installable within said memory system, said memory module boards being identical and said identification section of each board being connected in common.

3. The system of claim 1 wherein said decoder circuit means includes a plurality of decoder circuits, each of said plurality of said decoder circuits having an enabling input circuit and an input select circuit, said enabling input circuit of each of said plurality of said decoder circuits being coupled to receive at least one of said coded identification signals and said input select circuit of each decoder circuit being coupled to receive at least one of said different address bit combinations of said predetermined multibit address portion, each decoder circuit when enabled by said coded identification signals being operative to generate said decode selection signals for application to said memory module boards in said predetermined sequence as specified by the coding of said different address bit combination applied to said decoder circuit input select circuit.

4. The system of claim 3 wherein said memory request address further includes row and column address portions, said main board further including an address section comprising:
   a plurality of address registers, a first one of said registers being coupled to said decoder circuit means and connected for storing said predetermined multibit address, second and third ones of said registers being coupled to said memory module boards and connected for storing said row and column address portions respectively; and
   a multiplexer circuit having a number of input control terminals, a plurality of input terminals and at least one output terminal, said input control terminals being connected to receive said second one of said identification signals and a timing signal coded for indicating the portion of a memory cycle of operation being performed, each of said plurality of input terminals being connected to said first address register for receiving a different predetermined one of said address bits of said predetermined multibit address portion and said number of output terminals being coupled to said memory module boards, said multiplexer circuit being enabled for operation when said second one of said identification signals is coded to specify said first type of chip, and said multiplexer circuit when enabled for operation being conditioned to apply to said output terminal, said different predetermined ones of said address bits during said portion of said memory cycle specified by the coding of said timing signal as the most significant address bits of said row and column address portions applied to said memory module boards by said first and second address registers.

5. The system of claim 4 wherein said main board further includes timing and control circuits, coupled to said address register section and to said memory module boards, said circuits being operative to generate a sequence of timing signals for conditioning said memory module boards for performing a memory cycle of operation in response to said each memory request, a first one of said timing signals being generated at the start of said memory cycle of operation for strobing said row address portion into said memory chips of one of said number of rows of said memory module boards selected by said decoder circuit means and a second one of said timing signals corresponding to said timing signal, said second timing signal being generated subsequent to said start of said memory cycle of operation for conditioning said third address register to apply said column address portion to said memory module boards.

6. The memory system of claim 5 wherein said memory section of each memory board further includes: a number of jumper conductor means selectively connected to said multiplexer circuit output terminal for receiving said most significant row and column address bits, said number of jumper conductor means being connected to said multiplexer circuit when a first one of said identification signals is coded to specify that said memory section contains said first type of chips and said number of jumper conductor means being disconnected from said multiplexer circuit when said first one of said identification signals is coded to specify that said memory section contains a second type of memory chips.

7. The memory system of claim 5 wherein said memory section of each memory module board further includes:
   a plurality of gating circuits corresponding in number to the maximum number of blocks includable in said section, each of said gating circuits having a plurality of input terminals and an output terminal, one of said plurality of input terminals being connected to said timing and control circuits for receiving said first one of said timing signals, another one of said plurality of input terminals being connected to said plurality of decoder circuits for receiving a corresponding one of said row decode selection signals and said output terminal being connected to each of said chips of a corresponding one of said blocks, each of said gating circuits being operative in response to said first one of said timing signals and said decode selection signals to generate an enable output signal for simultaneously conditioning each of said chips of said corresponding one of said blocks to store said row address portion.

8. The system of claim 1 wherein said memory module boards are constructed to have one of a plurality of densities and to have one of a plurality of types of memory chips, said means of said identification section including a plurality of output terminals and a corresponding number of configurable jumper conductor means selectively connected to different ones of said output terminals for generating said coded identification signals.

9. The system of claim 8 wherein a first one of said number of configurable jumper conductor means when connected to a first one of said output terminals generates a first one of said identification signals coded to specify that said memory section contains first types of memory chips in said number of blocks and said first one of said number of configurable jumper conductor means when disconnected from said first one of said output terminals generates said first one of said identification signals coded to specify that said memory section contains second types of memory chips in said number of blocks.

10. The system of claim 9 wherein a second one of said number of configurable jumper connector means when connected to a second one of said output terminals generates a second one of said identification signals coded to specify that said memory module board has a first density of said blocks of memory chips and said second one of said number of configurable jumper conductor means when disconnected from said second one of said output terminals generates said second one of said identification signals coded to specify that said memory module board contains a second density of said rows of memory chips.

11. The system of claim 10 wherein said decoder circuit means includes means for connecting in common said first and second ones of said output terminals of said identification sections of memory module boards.

12. The system of claim 11 wherein said decoder circuit means further includes:
   a first decoder circuit having at least one enabling input terminal, a plurality of input select terminals, and a plurality of output terminals, said enabling input terminal being connected to receive said first and second ones of said identification signals and said plurality of input select terminals being connected to receive a first combination of address bits of said multibit address portion, said first decoder circuit being enabled for operation only when said first and second ones of said identification signals are coded to specify that said memory sections of said number of memory module boards have said second density and contain said second type of memory chips and said first decoder circuit when enabled being operative to generate a first group of said number of said row decode selection signals in said predetermined sequence for successively addressing blocks of storage locations within each of said number of memory module boards.

13. The system of claim 12 wherein said number of memory module boards is two, said second type of chip is a 64K RAM chip and said second density is normal density, each of said number of blocks of a first of said two boards being coupled to a different one of a first group of said first decoder circuit output terminals and each of said number of blocks of a second of said two boards being coupled to a different one of a second group of said first decoder circuit output terminals, said first decoder circuit being operative in response to successively increasing values of said first combination of address bits to enable for access locations in successive blocks of 64K RAM chips in said first and then said second memory module boards.

14. The system of claim 13 wherein each of said memory sections of said first and second boards is partially populated with blocks of chips corresponding to said normal density.

15. The system of claim 12 wherein said decoder circuit means further includes:
   a second decoder circuit having a number of enabling input terminals, a plurality of input select terminals and a plurality of output terminals, said number of enabling input terminals being connected to receive said first and second ones of said identification signals and said plurality of input select terminals being connected to receive a second combination of address bits of said multibit address portion, said second decoder circuit being enabled for operation only when said first and second ones of said identification signals are coded to specify that said memory sections of said number of memory module boards have said first density and contain said second type of memory chips and said second decoder circuit when enabled being operative to generate said number of said decode selection signals in said predetermined sequence for successively addressing blocks of storage locations within each of said number of memory module boards.

16. The system of claim 15 wherein said number of memory module boards is at least two, said second type of chip is a 64K RAM chip and said first density is double density, each of said number of said blocks of said two boards being coupled to different ones of said second decoder circuit output terminals, said second decoder circuit being operative in response to successively increasing values of said second combination of address bits to enable for access storage locations in successive groups of blocks of 64K RAM chips in said first and second memory module boards.

17. The system of claim 16 wherein said memory sections of said boards are fully populated with blocks of chips corresponding to said double density.

18. The system of claim 15 wherein said decoder circuit means further includes:
   a third decoder circuit having at least one enabling input terminal, a plurality of input select terminals and a plurality of output terminals, said enabling input terminal being connected to receive said second one of said identification signals and said plurality of input select terminals being connected to receive a third combination of address bits of said multibit address portion, said third decoder circuit being enabled for operation only when said second one of said identification signals is coded to specify that said memory sections of said number of memory module boards contain said first type of memory chips and said third decoder circuit when enabled being operative to generate a portion of said number of said decode selection signals in said predetermined sequence for successively addressing blocks of storage locations within each of said number of memory module boards.

19. The system of claim 15 wherein said number of memory module boards is one and said first type of chip is a 256K RAM chip, each of said number of rows of said board being coupled to a different one of said third decoder circuit output terminals, said third decoder circuit being operative in response to successively increasing values of said third combination of address bits to enable for access storage locations in successive blocks of 256K RAM chips in said memory module board.

20. The system of claim 19 wherein said memory section of said board is fully populated with blocks of chips corresponding to said double density.

21. The system of claim 18 wherein said enabling input terminal of said third decoder circuit is connected to receive said first one of said identification signals, said third decoder being enabled for operation only when said first and second ones of said identification signals are coded to specify that said memory sections of said number of memory module boards have said second density and contain said first type of memory chips, and said third decoder circuit when enabled for operation being operative to generate said portion of said number of said row decode selection signals in said predetermined sequence for successively addressing blocks of storage locations within each of said number of memory module boards.

22. The system of claim 21 wherein said number of said memory module boards is at least two, said first type of chip is a 256K RAM chip and said second density is normal density, each of said number of blocks of a first of said two boards being coupled to a different one of a first group of said third decoder circuit output terminals and each of said number of blocks of a second of said two boards being coupled to a different one of a second group of said third decoder circuit output terminals, said third decoder circuit being operative in response to successively increasing values of said third combination of address bits to enable for access locations in successive blocks of 256K RAM chips in said first and then in said second memory module boards.

23. The system of claim 22 wherein each of said memory sections of said boards is partially populated with blocks of chips corresponding to said normal density.

24. The system of claim 18 wherein said decoder circuit means further includes:

a fourth decoder circuit having a number of enabling input terminals, a plurality of input select terminals and a plurality of output terminals, said enabling input terminals being connected to receive said first and second ones of said identification signals and said plurality of input select terminals being connected to receive a fourth combination of address bits of said multibit address portion increased to provide an expanded addressing capability, said fourth decoder circuit being enabled for operation only when said first and second ones of said identification signals are coded to specify that said number of memory module boards have said first density and contain said first type of memory chips and said fourth decoder circuit when enabled for operation being operative to generate said number of said decode selection signals in said predetermined sequence for successively addressing blocks of storage locations within each of said number of memory module boards.

25. The system of claim 24 wherein said number of said memory module boards is at least two, said first type of chip is a 256K RAM chip and said first density is double density, each of said blocks of said two boards being coupled to a different one of said fourth decoder circuit output terminals, said fourth decoder circuit being operative in response to successively increasing values of said fourth combination of address bits to enable for access, storage locations in successive groups of blocks of 256K RAM chips in said first and second memory module boards.

26. The system of claim 25 wherein said memory sections of said boards are fully populated with blocks of chips corresponding to said double density.

27. The system of claim 11 wherein said decoder circuit means further comprises a number of decoder circuits including a first decoder circuit having at least one enabling input terminal, a plurality of input select terminals and a plurality of output terminals, said one enabling input terminal being connected to receive said first one of said identification signals and said input select terminals being selectively connected to receive first and second combinations of address bits of said multibit address portion, said first decoder circuit being enabled for operation when said first one of said identification signals is coded to specify said second density and said first decoder circuit when enabled being operative to generate a first group of said number of said row decode selection signals in said predetermined sequence for addressing storage locations within successive blocks of first or second types of memory chips in each of said number of memory module boards.

28. The system of claim 27 wherein said number of memory module boards is at least two, said first or second type is a 256K RAM or 64K RAM chip and said second density is normal density, each of said number of blocks of a first of said two boards being coupled to a different one of a first group of said first decoder circuit output terminals and each of said number of blocks of a second of said two boards being coupled to a different one of a second group of said first decoder circuit output terminals, said first decoder circuit being operative in response to successively increasing values of said first and second combinations of address bits to enable for access, storage locations in successive blocks of 256K RAM or 64K RAM chips in said first and then said second memory module boards.

29. The system of claim 27 wherein said number of decoder circuits further includes:

a second decoder circuit having a number of enabling input terminals, a plurality of input select terminals and a plurality of output terminals, said number of enabling input terminals being connected to receive said first one of said identification signals and said input select terminals being selectively connected to receive third and fourth combinations of address bits of said multibit address portion, said second decoder circuit being enabled for operation when said first one of said identification signals is coded to specify said first density and said second decoder circuit when enabled being operative to generate said number of said decode selection signals in said predetermined sequence for successively addressing storage locations within said first or second type of memory chips in each of said number of memory module boards.

30. The system of claim 29 wherein said number of memory module boards is at least two, said first or second type is a 256K RAM or 64K RAM chip and said first density is double density, each of said number of rows of said two boards being coupled to a different one of said second decoder circuit output terminals, said second decoder circuit being operative in response to successively increasing values of said third and fourth combinations of address bits to enable for access storage locations in successive groups of blocks of 256K RAM or 64K RAM chips in said first and second memory module boards.

31. The system of claim 27 wherein said decoder circuit means further includes an address multiplexer circuit having a select input terminal, a number of sets of input terminals and a corresponding number of output terminals, said select input terminal being connected to receive said second one of said identification signals, a first one of each of a first plurality of said number of sets of input terminals being connected to receive said first combination of address bits and a second of each of said plurality of said number of sets of input terminals being connected to receive said second combination of address bits and a first plurality of said output terminals associated with said first plurality of said number of sets of input terminals being connected to said input select terminals of said first decoder circuit, said second one of said identification signals when coded to specify said first type of chip conditioning said multiplexer circuit to apply said first combination of address bits to said first plurality of output terminals and said second one of said identification signals when coded to specify said second type of chip conditioning said multiplexer circuit to apply said second combination of address bits to said first plurality of output terminals.

32. The system of claim 29 wherein said decoder circuit means further includes an address multiplexer circuit having a select input terminal, a number of sets of input terminals and a corresponding number of output terminals, said select input terminal being connected to receive said second one of said identification signals, a first one of each of a second plurality of said number of sets of input terminals being connected to receive said third combination of address bits and a second of each of said second plurality of said number of sets of input terminals being connected to receive said third combination of address bits and a second plurality of said output terminals associated with said second plurality of said number of sets of input terminals being connected to said input select terminals of said second decoder circuit, said second one of said identification signals when coded to specify said first type of chip conditioning said multiplexer circuit to apply said third combination of address bits to said second plurality of output terminals and said second one of said identification signals when coded to specify said second type of chip conditioning said multiplexer circuit to apply said fourth combination of address bits to said second plurality of output terminals.

33. A memory system for accessing data words in response to memory requests, each request having an address coded for specifying a data word to be accessed, said memory system comprising:
 a number of identical memory module boards, each including:
  a memory section having a number of rows of addressable memory parts, said number of rows and memory parts selected in constructing said memory section defining different characteristics of said memory module board; and
  identification section for generating a plurality of identification signals coded for indicating said different characteristics, said identification section of each of said number of boards being connected in common; and
 a main board coupled to each of said number of identical memory module boards, said main board including decoder circuit means being coupled to said identification and memory sections of each memory module board and for receiving a predetermined multibit address portion of said address of each request, said decoder circuit means being conditioned by said identification signals for decoding different address bit combinations of said predetermined multibit address portion selected as a function of said coded identification signals to generate said number of said row decode selection signals in a manner for successively addressing of said pluralities of storage locations within each of said rows of said number of identical memory module boards.

34. The system of claim 33 wherein said predetermined multibit address portion corresponds to a number of most significant address bits coded for specifying a maximum number of rows of memory chips includable on said number of identical memory boards installable within said memory system.

35. The system of claim 33 wherein said decoder circuit means includes a plurality of decoder circuits, each of said plurality of said decoder circuits having an enabling input circuit and an input select circuit, said enabling input circuit of each of said plurality of said decoder circuits being coupled to receive at least one of said coded identification signals and said input select circuit of each decoder circuit being coupled to receive at least one of said different address bit combinations of said predetermined multibit address portion, each decoder circuit when enabled by said coded identification signals being operative to generate said row decode selection signals for application to said memory module boards in said predetermined sequence as specified by the coding of said different address bit combination applied to said decoder circuit input select circuit.

36. The system of claim 33 wherein said memory module boards are constructed to have one of a plurality of densities and to have one of a plurality of types of memory chips, said means of said identification section including a plurality of output terminals and a corresponding number of configurable jumper conductor means selectively connected to different ones of said output terminals for generating said coded identification signals.

37. The system of claim 36 wherein a first one of said number of configurable jumper conductor means being selectively connected to a first one of said output terminals for generating a first one of said identification signals coded to specify when said memory section contains first or second types of memory chips in said number of rows; and
 a second one of said number of configurable jumper connector means being selectively connected to a second one of said output terminals for generating a second one of said identification signals coded to specify when said memory module board has a first density or second density of said rows of memory chips.

38. The system of claim 35 wherein said decoder circuit means further includes:
 first and second decoder circuits, each having a number of enabling input terminals, a plurality of input select terminals, and a plurality of output terminals, said enabling input terminals of said first and second decoder circuits being connected to receive said first and second ones of said identification signals and said plurality of input select terminals of said first and second decoder circuits being connected to receive first and second combinations of address bits of said multibit address portion, said first decoder circuit being enabled for operation only when said first and second ones of said identification signals are coded to specify that said memory sections of said number of memory module boards have said second density and contain said second type of memory chips and said second decoder circuit being enabled for operation only when said first and second ones of said identification signals are coded to specify that said memory sections of said number of memory module boards have said first density and contain said second type of memory chips and said first and second decoder circuits when enabled being operative to generate said row decode selection signals in said predetermined sequence for successively addressing storage locations within said rows of each of said number of memory module boards.

39. The system of claim 38 wherein said number of memory module boards is two, said second type of chip is a 64K RAM chip and said first and second densities are double and normal densities, each of said number of rows of a first of said two boards being coupled to a different one of a first group of said first decoder circuit output terminals and each of said number of rows of a second of said two boards being coupled to a different one of a second group of said first decoder circuit output terminals and each of said number of rows of said two boards being coupled to different ones of said second and decoder circuit output terminals, said first and second decoder circuits being operative in response to successively increasing values of said first and second combinations of address bits to enable for access locations in successive rows of 64K RAM chips in said first and then said second memory module boards.

40. The system of claim 38 wherein said decoder circuit means further includes:
a third decoder circuit having at least one enabling input terminal, a plurality of input select terminals and a plurality of output terminals, said enabling input terminal being connected to receive said second one of said identification signals and said plurality of input select terminals being connected to receive a third combination of address bits of said multibit address portion, said third decoder circuit being enabled for operation only when said second one of said identification signals is coded to specify that said memory sections of said number of memory module boards contain said first type of memory chips and said third decoder circuit when enabled being operative to generate a portion of said number of said row decode selection signals in said predetermined sequence for successively addressing blocks of storage locations within each of said number of memory module boards.

41. The system of claim 40 wherein said number of memory module boards is one and said first type of chip is a 256K RAM chip, each of said number of rows of said board being coupled to a different one of said third decoder circuit output terminals, said third decoder circuit being operative in response to successively increasing values of said third combination of address bits to enable for access storage locations in successive rows of 256K RAM chips in said memory module board.

42. The system of claim 41 wherein said memory section of said board is fully populated with rows of chips corresponding to said double density.

43. The system of claim 38 wherein said decoder circuit means further comprises first and second decoder circuits having a number of enabling input terminals, a plurality of input select terminals and a plurality of output terminals, said enabling input terminals of said first and second decoder circuits being connected to receive said first one of said identification signals and said input select terminals of said first and second decoder circuits being selectively connected to receive first and second combinations and third and fourth combinations of address bits of said multibit address portion, said first and second decoder circuits, respectively, being enabled for operation when said first one of said identification signals is coded to specify said second and said first densities, said first and second decoder circuits when enabled being operative to generate said row decode selection signals in said predetermined sequence for addressing storage locations within successive rows of first or second types of memory chips in each of said number of memory module boards.

44. The system of claim 43 wherein said decoder circuit means further includes an address multiplexer circuit having a select input terminal, a number of sets of input terminals and a corresponding number of output terminals, said select input terminal being connected to receive said second one of said identification signals, a first one of each of first and second pluralities of said number of sets of input terminals being connected to receive said first and third combinations of address bits, a second of each of said first and second pluralities of said number of sets of input terminals being connected to receive said second and fourth combinations of address bits and first and second pluralities of said output terminals associated with said first and second pluralities of said number of sets of input terminals being connected to said input select terminals of said first and second decoder circuits, said second one of said identification signals when coded to specify said first type of chip conditioning said multiplexer circuit to apply said first and third combinations of address bits to said first and second pluralities of output terminals and said second one of said identification signals when coded to specify said second type of chip conditioning said multiplexer circuit to apply said second and fourth combinations of address bits to said first and second pluralities of output terminals.

45. The system of claim 33 wherein said memory request address further includes row and column address portions, said main board further including an address section comprising:
a plurality of address registers, a first one of said registers being coupled to said decoder circuit means and connected for storing said predetermined multibit address, second and third ones of said registers being coupled to said memory module boards and connected for storing said row and column address portions respectively; and
a multiplexer circuit having a number of input control terminals, a plurality of input terminals and at least one output terminal, said input control terminals being connected to receive said second one of said identification signals and a timing signal coded for indicating the portion of a memory cycle of operation being performed, each of said plurality of input terminals being connected to said first address register for receiving a different predetermined one of said address bits of said predetermined multibit address portion and said number of output terminals being coupled to said memory module boards, said multiplexer circuit being enabled for operation when said second one of said identification signals is coded to specify said first type of chip, and said multiplexer circuit when enabled for operation being conditioned to apply to said output terminal, said different predetermined ones of said address bits during said portion of said memory cycle specified by the coding of said timing signal as the most significant address bits of said row and column address portions applied to said memory module boards by said first and second address registers.

46. The system of claim 45 wherein said main board further includes timing and control circuits, coupled to said address register section and to said memory module boards, said circuits being operative to generate a sequence of timing signals for conditioning said memory module boards for performing a memory cycle of operation in response to said each memory request, a first one of said timing signals being generated at the start of said memory cycle of operation for strobing said row address portion into said memory chips of one of said number of rows of said memory module boards selected by said decoder circuit means and a second one of said timing signals corresponding to said timing signal, said second timing signal being generated subsequent to said start of said memory cycle of operation for conditioning said third address register to apply said column address portion to said memory module boards.

47. The memory system of claim 45 wherein said memory section of each memory board further includes:

a number of jumper conductor means selectively connected to said multiplexer circuit output terminal for receiving said most significant row and column address bits, said number of jumper conductor means being connected to said multiplexer circuit when a first one of said identification signals is coded to specify that said memory section contains said first type of chips and said number of jumper conductor means being disconnected from said multiplexer circuit when said first one of said identification signals is coded to specify that said memory section contains a second type of memory chips.

48. A method of constructing a memory system having a main board and a number of identical memory module boards with different types of memory parts and having different board densities, said method comprising the steps of:

constructing each of said memory module boards to include a memory section and an identification section;

constructing said memory section of each of said memory module boards to accommodate the type of said memory part having the largest number of bit locations;

mounting permanently in said memory section, a number of addressable memory parts of one of said types positioned in blocks so as to provide a given one of said densities;

constructing said identification section for generating identification signals coded for indicating said type of memory part and said board density;

connecting said identification section of each board in common, so as to provide a single set of said coded identification signals;

constructing said main board to include decoder circuit means, having a number of output terminals;

connecting said decoder circuit means to receive a predetermined multibit address portion of the address of each memory request applied to said system and connecting said decoder means to decode different address bit combinations of said predetermined multibit address portion as a function of said coded identification signals and generate a number of row decode selection signals on said output terminals; and selectively connecting groups of said output terminals to different ones of said memory module boards for enabling the successive addressing of said blocks of said memory parts of said number of boards.

49. A computer memory comprising a plurality of memory module boards connected to a memory control board, wherein said memory control board receives addresses representing a particular storage location of one of said module boards and responds by causing information to be written into or read out therefrom, said memory comprising:

each of said memory module boards including:

a plurality of addressable chip storage units, each of said chip storage units being coupled to receive address signals representing a particular storage location to be accessed;

circuit means for receiving chip storage unit selection denoting signals and for coupling each of said selection denoting signals to a respective one of said chip storage units, each of said selection denoting signals when in a predetermined state enabling the corresponding chip storage unit to perform a cycle of operation upon the addressed storage location; and, identification circuit means for delivering identification signals indicating the type of chip storage units and the populated density of said memory module board, and said common memory control board comprising:

decoding circuit means coupled to receive said identification signals and conditioned to perform a particular decoding function in response to the collective states of said signals; and, circuit means adapted to receiving said address signals and to apply a subset of said signals to said decoding circuit, said decoding circuit, as conditioned by said identification signals, decoding said signal subset to deliver to said chip storage unit, said selection denoting signals in which one of said signals is in said predetermined state.

* * * * *